(12) United States Patent
Zisimopoulos et al.

(10) Patent No.: US 12,063,588 B2
(45) Date of Patent: *Aug. 13, 2024

(54) SELECTION OF PROXIMITY SERVICES RELAY

(71) Applicant: QUALCOMM Incorporated, San Diego, CA (US)

(72) Inventors: Haris Zisimopoulos, London (GB); Hong Cheng, Basking Ridge, NJ (US); Sudhir Kumar Baghel, Pleasanton, CA (US); Michaela Vanderveen, Tracy, CA (US); Shailesh Patil, San Diego, CA (US); Saurabha Rangrao Tavildar, San Francisco, CA (US); Kapil Gulati, Belle Mead, NJ (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/655,734

(22) Filed: Mar. 21, 2022

(65) Prior Publication Data

US 2022/0217622 A1 Jul. 7, 2022

Related U.S. Application Data

(63) Continuation of application No. 15/061,092, filed on Mar. 4, 2016, now Pat. No. 11,284,337.
(Continued)

(51) Int. Cl.
| H04W 48/16 | (2009.01) |
| H04L 12/18 | (2006.01) |

(Continued)

(52) U.S. Cl.
CPC ........... *H04W 48/16* (2013.01); *H04L 12/185* (2013.01); *H04W 8/005* (2013.01); *H04W 88/04* (2013.01);
(Continued)

(58) Field of Classification Search
CPC ... H04W 48/16; H04W 8/005; H04W 76/023; H04W 76/002; H04W 48/08; H04W 24/10; H04W 4/06; H04W 88/04; H04L 12/185

See application file for complete search history.

(56) References Cited

U.S. PATENT DOCUMENTS

| 9,265,078 B2 | 2/2016 | Lim et al. |
| 10,531,365 B2 | 1/2020 | Kaur et al. |

(Continued)

FOREIGN PATENT DOCUMENTS

| CN | 105009610 A | 10/2015 |
| EP | 2833694 A2 | 2/2015 |

(Continued)

OTHER PUBLICATIONS 20141N-6381/CHE/2014, priority document of US20170359766A1, 66 pages (Year: 2014).
(Continued)

*Primary Examiner* — Sharmin Chowdhury
(74) *Attorney, Agent, or Firm* — Guang Yu Zhang; Holland & Hart LLP

(57) ABSTRACT

Techniques are described for wireless communication. A method for wireless communication at a user equipment (UE) includes configuring a relay selection rule; receiving at least one discovery message from each of a plurality of proximity services (ProSe) relay candidates providing access to a network; evaluating the received discovery messages with respect to the relay selection rule; selecting a
(Continued)

first ProSe relay candidate from the plurality of ProSe relay candidates based at least in part on the evaluating; and connecting to the network via the first ProSe relay candidate. A method for wireless communication at a ProSe relay candidate includes receiving, from a network, a ProSe Relay Indication (PRI); broadcasting at least one discovery message that includes the PRI; and receiving a relay connection request from a UE based at least in part on a compliance of the at least one discovery message with a relay selection rule of the UE.

28 Claims, 14 Drawing Sheets

Related U.S. Application Data

(60) Provisional application No. 62/139,335, filed on Mar. 27, 2015.

(51) Int. Cl.
| | |
|---|---|
| H04W 8/00 | (2009.01) |
| H04W 88/04 | (2009.01) |
| H04W 4/06 | (2009.01) |
| H04W 24/10 | (2009.01) |
| H04W 48/08 | (2009.01) |
| H04W 76/14 | (2018.01) |
| H04W 76/40 | (2018.01) |

(52) U.S. Cl.
 CPC .............. *H04W 4/06* (2013.01); *H04W 24/10* (2013.01); *H04W 48/08* (2013.01); *H04W 76/14* (2018.02); *H04W 76/40* (2018.02)

(56) References Cited

U.S. PATENT DOCUMENTS

| | | |
|---|---|---|
| 11,284,337 B2 | 3/2022 | Zisimopoulos et al. |
| 2011/0007692 A1 | 1/2011 | Seok |
| 2012/0314609 A1 | 12/2012 | Chang et al. |
| 2014/0204834 A1 | 7/2014 | Singh et al. |
| 2015/0029866 A1 | 1/2015 | Liao et al. |
| 2015/0230114 A1 | 8/2015 | Delsol et al. |
| 2016/0100305 A1 | 4/2016 | Karampatsis et al. |
| 2016/0128116 A1 | 5/2016 | Kim et al. |
| 2016/0135203 A1 | 5/2016 | Kim et al. |
| 2016/0249307 A1 | 8/2016 | Thangarasa et al. |
| 2017/0105169 A1 | 4/2017 | Enomoto et al. |
| 2017/0111273 A1 | 4/2017 | Kuge et al. |
| 2017/0359766 A1 | 12/2017 | Agiwal et al. |

FOREIGN PATENT DOCUMENTS

| | | | |
|---|---|---|---|
| WO | WO-2014063092 A1 | 4/2014 | |
| WO | WO-2014113083 A1 | 7/2014 | |
| WO | WO-2015002456 A1 | 1/2015 | |
| WO | WO-2015026111 A1 | 2/2015 | |

OTHER PUBLICATIONS

3GPP TR 23.713, "3rd Generation Partnership Project; Technical Specification Group Services and System Aspects; Study on extended Architecture Support for Proximity-based Services (Release 13)", 3GPP Standard; 3GPP TR 23.713, V0.4.0, 3rd Generation Partnership Project (3GPP), Mobile Competence Centre ; 650, Route Des Lucioles ; F-06921 Sophia-Antipolis Cedex ; France, val. SA WG2, No. V0.4.0, Feb. 12, 2015 (Feb. 12, 2015), XP050927604, pp. 1-59, [retrieved on Feb. 12, 2015].
3GPP TS 23.303, "3rd Generation PartnershipProject, Technical Specification Group Services and System Aspects, Proximity-basedservices (ProSe), Stage 2 (Release 12)", 3GPP TS 23.303, V12.4.0, Mar. 19, 2015, pp. 1-63.
"3rd Generation Partnership Project; Technical Specification Group Services and System Aspects; Study on Architecture Enhancements to Support Proximity-Based Services (ProSe) (Release 12)", 3GPP Standard, Technical Report, 3GPP TR 23.703, 3rd Generation Partnership Project (3GPP), Mobile Competence Centre, 650, Route Des Lucioles, F-06921 Sophia-Antipolis Cedex, France, vol. SA WG2. No. V12.0.0, Mar. 10, 2014 (Mar. 10, 2014), pp. 1-324, XP050769633, [retrieved on Mar. 10, 2014]* chapters 6.3.10. 6.3.12 ** chapters 4.1.3-4.3.1. 5.5. 6.2. 8.6, A.2. D * 4.6.2.3, 5.5.1, 6.1.1.2.2, 6.2.8.1.2, 6.3.1.1.2,6.3.6.1.7, 6.3.9.2.1, 6.3.12.2.2, 6.4.1.2, The whole document.
Catt: "Considerations about ProSe UE-UE Relays", 3GPP Draft; S2-142853, 3rd Generation Partnership Project (3GPP), Mobile Competence Centre ; 650, Route Des Lucioles ; F-06921 Sophia-Antipolis Cedex ; France, vol. SA WG2, No. Dublin, Ireland; Jul. 7, 2014-Jul. 11, 2014 Jul. 11, 2014 (Jul. 11, 2014 ), XP050805502, pp. 1-3. Retrieved from the Internet:URL: http://www.3gpp.org/ftp/Meetings_3GPP_SYNC/SA2/Docs/ [retrieved on Jul. 11, 2014].
International Preliminary Report on Patentability—PCT/US2016/021166, The International Bureau of WIPO—Geneva, Switzerland, Oct. 3, 2017 (152734WO).
International Search Report and Written Opinion—PCT/US2016/021166—ISA/EPO—May 30, 2016 (152734WO).
LG Electronics: "Solution on ProSe Relay Selection and Re-selection", 3GPP TSG-SA WG2 Meeting #100, 3GPP Draft; S2-134143_S2_100_ProSe_Relay Reselection_V4, 3rd Generation Partnership Project (3GPP), Mobile Competence Centre; 650, Route Des Lucioles; F-06921 Sophia-Antipolis Cedex; France, vol. SA WG2, No. San Francisco, USA; Nov. 11, 2013-Nov. 15, 2013, Nov. 12, 2013 (Nov. 12, 2013), XP050744203, pp. 1-6. Retrieved from the Internet: International application No. URL: https://www.3gpp.org/ftp/tsg_sa/WG2_Arch/TSGS2_100_San_Francisco/Docs/S2-134143.zip, https://www.3gpp.org/DynaReport/TDocExMtg-S2-100, Sec. 6.3.X, [retrieved on Nov. 12, 2013].
LG Electronics: "Solution on Relay for Public Safety ProSe", 3GPP Draft; S2-132614_P-CR_23703_Relay_V3, 3rd Generation Partnership Project (3GPP), Mobile Competence Centre; 650, Route Des Lucioles; F-06921 Sophia-Antipolis Cedex; France, vol. SA WG2, No. Valencia, Spain; Jul. 15, 2013-Jul. 19, 2013, Jul. 9, 2013, XP050725994, Retrieved from the Internet: URL: http://www.3gpp.org/ftp/tsg_sa/WG2_Arch/TSGS2_98_Valencia/Docs/ [retrieved on Jul. 9, 2013], pp. 1-6.
Sony: "Considerations on ProSe Relays Selection", 3GPP TSG-SA WG2#105, 3GPP Draft, S2-143134, 3rd Generation Partnership Project (3GPP), Mobile Competence Centre, 650, Route Des Lucioles, F-06921 Sophia-Antipolis Cedex, France, vol. SA WG2, No. Sapporo, Japan, Oct. 13, 2014-Oct. 17, 2014, Oct. 12, 2014 (Oct. 12, 2014), pp. 1-7, XP050880710, Retrieved from the Internet: URL: https://www.3gpp.org/ftp/tsg_sa/WG2_Arch/TSGS2_105_Sapporo/Docs/S2-143134.zip, Sec. 2 [retrieved on Oct. 12, 2014] paragraph [0001]-paragraph [0002] figures 1,2.
Taiwan Search Report—TW105106926—TIPO—Jan. 3, 2020 (152734TW).
3GPP TR 23.703: "3rd Generation Partnership Project, Technical Specification Group Services and System Aspects, Study on Architecture Enhancements to Support Proximity-based Services (ProSe) (Release 12)", V2.0.0 (Feb. 2014), 324 Pages, 2014.

SELECTION OF PROXIMITY SERVICES RELAY

CROSS REFERENCES

The present Application for Patent is a continuation of U.S. patent application Ser. No. 15/061,092 by Zisimopoulos, et al., entitled "Selection of Proximity Services Relay," filed Mar. 4, 2016, which claims priority to U.S. Provisional Patent Application No. 62/139,335 by Zisimopoulos, et al., entitled "Selection of Proximity Services Relay," filed Mar. 27, 2015; each of which is assigned to the assignee hereof and expressly incorporated by reference herein.

BACKGROUND

Field of the Disclosure

The present disclosure, for example, relates to wireless communication systems, and more particularly to techniques for selecting a proximity services (ProSe) relay at a user equipment (UE).

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, Wi-Fi access points, or other nodes, each simultaneously supporting communication for multiple communication devices, otherwise known as UEs. A base station or Wi-Fi access point may communicate with UEs on downlink channels (e.g., for transmissions from a base station or Wi-Fi access point to a UE) and uplink channels (e.g., for transmissions from a UE to a base station or Wi-Fi access point).

Each base station within a wireless communication system may be associated with a coverage area. When a UE is operated inside the coverage area of a base station, the UE may connect to a network to which the base station provides access by communicating with the base station. When the UE is operated outside the coverage area of the base station, the UE may in some cases be able to communicate with the base station, and connect to the network, via a ProSe relay.

SUMMARY

The present disclosure, for example, relates to one or more techniques for selecting a proximity services (ProSe) relay at a UE. Although "3rd Generation Partnership Project" (3GPP) standards such as TS 23.303 and TR 23.713 describe procedures for a user equipment (UE) to connect to a ProSe relay, 3GPP standards do not indicate how to select a more (or most) appropriate ProSe relay when multiple ProSe relay candidates are available. The 3GPP standards therefore allow a UE to connect to a ProSe relay despite a better ProSe relay candidate being available. Techniques described in the present disclosure enable a UE to select an appropriate (or most appropriate) ProSe relay from among a plurality of ProSe relay candidates.

In a first set of illustrative examples, a method for wireless communication at a UE is described. In one configuration, the method includes configuring the UE with a relay selection rule; receiving at least one ProSe discovery message from each of a plurality of ProSe relay candidates providing access to a network; evaluating the received ProSe discovery messages with respect to the relay selection rule; selecting a first ProSe relay candidate from the plurality of ProSe relay candidates based at least in part on the evaluating; and connecting to the network via the first ProSe relay candidate.

In some examples of the method, evaluating the received ProSe discovery messages with respect to the relay selection rule may include identifying a ProSe discovery message received from the first ProSe relay candidate as complying with the relay selection rule to a greater extent than at least one other ProSe discovery message received from at least one other ProSe relay candidate of the plurality of ProSe relay candidates. In some examples of the method, the at least one ProSe discovery message may include a relay offer message, and evaluating the received ProSe discovery messages with respect to the relay selection rule may include evaluating the relay offer message with respect to the relay selection rule. In some examples, the at least one ProSe discovery message may further include a Multimedia Broadcast Multicast Service (MBMS) relay information message, and the method may further include determining the MBMS relay information message identifies at least one MBMS desired by the UE; and further selecting the first ProSe relay candidate based at least in part on the MBMS relay information message identifying the at least one MBMS desired by the UE. In some examples of the method, the MBMS relay information message may include at least a E-UTRAN cell identity (ECI), or at least one temporary mobile group identity (TMGI), or at least one ProSe Group Identifier (ID), or a combination thereof In some examples of the method, the relay selection rule may include at least one relay radio layer condition. The at least one relay radio layer condition may include at least a threshold relay-to-network reference signal received power (RSRP), or a threshold relay-to-network reference signal received quality (RSRQ), or a threshold relay-to-UE RSRP, or a provisioned ProSe Relay Indication (PRI) indicating a relay selection policy for accessing the network, or a radio validity condition, or a combination thereof. In some examples, the radio validity condition may include at least a first radio validity condition indicating that each threshold condition of the at least one relay radio layer condition needs to be satisfied, or a second radio validity condition indicating that at least one threshold condition of the at least one relay radio layer condition needs to be satisfied. In some examples, the method may further include performing a bitwise logical AND between the provisioned PRI and a PRI received in the ProSe discovery messages. In some examples, the method may further include measuring a relay-to-UE RSRP; comparing the measured relay-to-UE RSRP to the threshold relay-to-UE RSRP; and performing a bitwise logical AND between the provisioned PRI and a PRI received in the ProSe discovery messages. In some examples of the method, the relay selection rule may further include at least one upper layer condition. The at least one upper layer condition may include at least a public land mobile network identifier (PLMN ID), or a ProSe Relay UE ID, or relay connectivity information, or relay status information, or an indicator of service continuity support, or a combination thereof. In some examples, the method may further include evaluating the at least one upper layer condition with respect to the relay selection rule upon determining a compliance of the at least one relay radio layer condition with the relay selection rule. In some examples, the method may further include evaluating the at least one relay radio layer condition with respect to the relay selection rule upon determining a compliance of the at least one upper layer condition with the relay selection rule. In some examples of the method, the UE may be configured according to the relay selection rule by a ProSe function.

In a second set of illustrative examples, an apparatus for wireless communication at a UE is described. In one configuration, the apparatus may include means for configuring the UE with a relay selection rule; means for receiving at least one ProSe discovery message from each of a plurality of ProSe relay candidates providing access to a network; means for evaluating the received ProSe discovery messages with respect to the relay selection rule; means for selecting a first ProSe relay candidate from the plurality of ProSe relay candidates based at least in part on the evaluating; and means for connecting to the network via the first ProSe relay candidate. In some examples, the apparatus may further include means for implementing one or more aspects of the method for wireless communication described above with respect to the first set of illustrative examples.

In a third set of illustrative examples, another apparatus for wireless communication at a UE is described. In one configuration, the apparatus may include a processor, memory in electronic communication with the processor, and instructions stored in the memory. The instructions may be executable by the processor to receive a relay selection rule; to receive at least one ProSe discovery message from each of a plurality of ProSe relay candidates providing access to a network; to evaluate the received ProSe discovery messages with respect to the relay selection rule; to select a first ProSe relay candidate from the plurality of ProSe relay candidates based at least in part on the evaluating; and to connect to the network via the first ProSe relay candidate. In some examples, the instructions may also be executable by the processor to implement one or more aspects of the method for wireless communication described above with respect to the first set of illustrative examples.

In a fourth set of illustrative examples, a non-transitory computer-readable medium storing computer-executable code for wireless communication is described. In one configuration, the code may be executable by a processor to receive a relay selection rule; to receive at least one ProSe discovery message from each of a plurality of ProSe relay candidates providing access to a network; to evaluate the received ProSe discovery messages with respect to the relay selection rule; to select a first ProSe relay candidate from the plurality of ProSe relay candidates based at least in part on the evaluating; and to connect to the network via the first ProSe relay candidate. In some examples, the code may also be executable by the processor to implement one or more aspects of the method for wireless communication described above with respect to the first set of illustrative examples.

In a fifth set of illustrative examples, a method for wireless communication at a ProSe relay candidate is described. In one configuration, the method includes receiving, from a network, a ProSe Relay Indication (PRI); broadcasting at least one ProSe discovery message that includes the PRI; and receiving a relay connection request from a UE based at least in part on a compliance of the at least one ProSe discovery message with a relay selection rule of the UE.

In some examples, the method may further include communicating with the network over a first communication link; measuring at least a relay-to-network RSRP, or a relay-to-network RSRQ, or a combination thereof; and indicating at least the measured relay-to-network RSRP, or the measured relay-to-network RSRQ, or a combination thereof in the at least one ProSe discovery message. In some examples of the method, the at least one ProSe discovery message may include a relay offer message. In some examples, the at least one ProSe discovery message may further include a MBMS relay information message.

In some examples of the method, the at least one ProSe discovery message may include at least one relay radio layer condition and at least one upper layer condition. In some examples of the method, the PRI may be received in a system information block (SIB) or a unicast radio resource control (RRC) message.

In a sixth set of illustrative examples, an apparatus for wireless communication at a ProSe relay candidate is described. In one configuration, the apparatus may include means for receiving, from a network, a PRI; means for broadcasting at least one ProSe discovery message that includes the PRI; and means for receiving a relay connection request from a UE based at least in part on a compliance of the at least one ProSe discovery message with a relay selection rule of the UE. In some examples, the apparatus may further include means for implementing one or more aspects of the method for wireless communication described above with respect to the fifth set of illustrative examples. In some examples, the instructions may also be executable by the processor to implement one or more aspects of the method for wireless communication described above with respect to the fifth set of illustrative examples.

In a seventh set of illustrative examples, another apparatus for wireless communication at a ProSe relay candidate is described. In one configuration, the apparatus may include a processor, memory in electronic communication with the processor, and instructions stored in the memory. The instructions may be executable by the processor to receive, from a network, a PRI; to broadcast at least one ProSe discovery message that includes the PRI; and to receive a relay connection request from a UE based at least in part on a compliance of the at least one ProSe discovery message with a relay selection rule of the UE.

In an eighth set of illustrative examples, another non-transitory computer-readable medium storing computer-executable code for wireless communication is described. In one configuration, the code may be executable by a processor to receive, from a network, a PRI; to broadcast at least one ProSe discovery message that includes the PRI; and to receive a relay connection request from a UE based at least in part on a compliance of the at least one ProSe discovery message with a relay selection rule of the UE. In some examples, the code may also be executable by the processor to implement one or more aspects of the method for wireless communication described above with respect to the fifth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described for selecting a proximity services (ProSe) relay at a user equipment (UE). A ProSe relay is a device capable of relaying communications between a network (e.g., a base station that provides access to the network) and one or more UEs. A ProSe relay may in some cases be a UE capable of providing proximity services. ProSe relays may be used, for example, to relay public safety broadcasts to UEs, or to more generally provide range extension for a wireless communication system (e.g., for a Long Term Evolution (LTE) or LTE Advanced (LTE-A) network).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
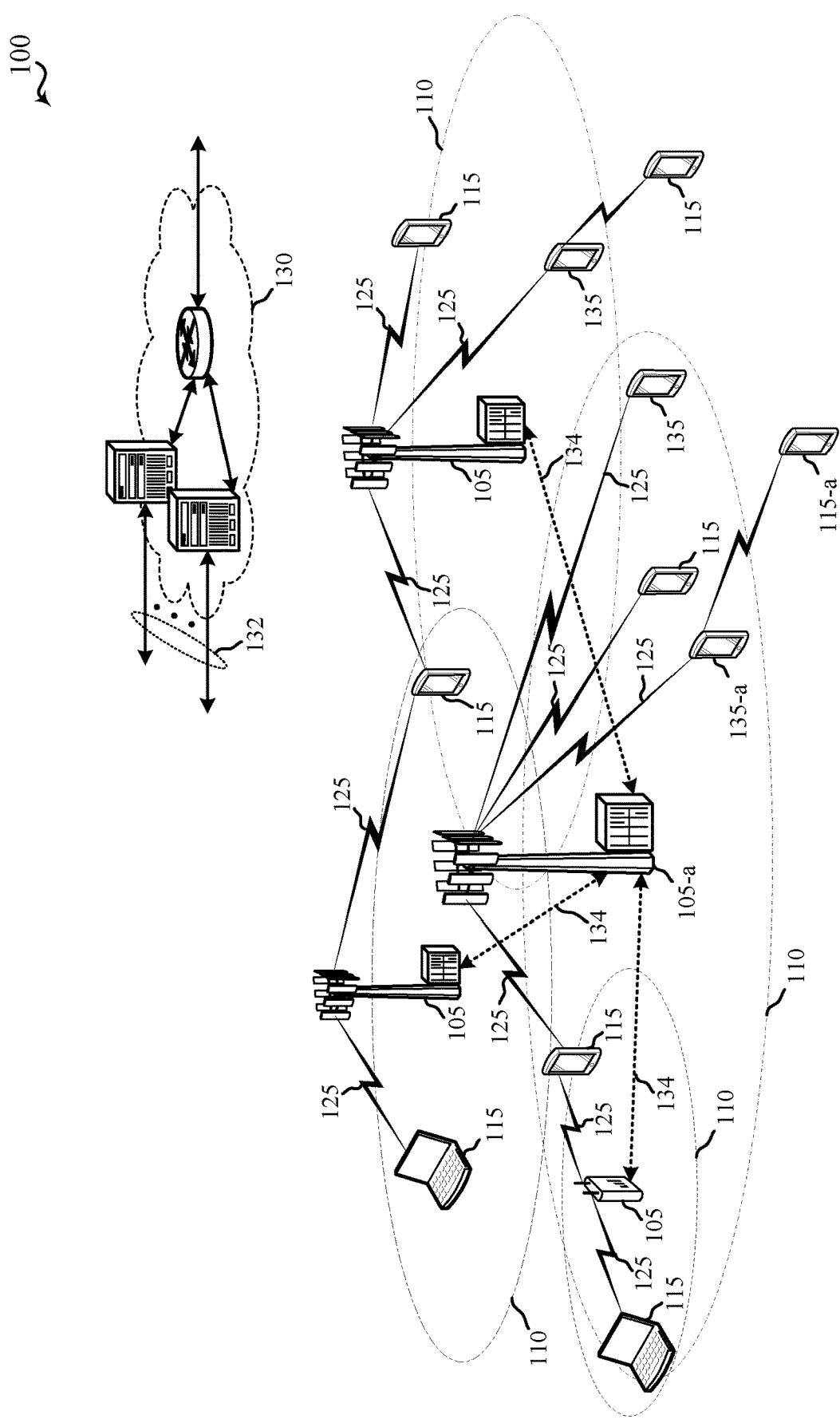
FIG. 1 illustrates an example of a wireless communication system, in accordance with various aspects of the disclosure.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via at least one base station antenna. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105 (or entities including one or more base stations 105). The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3rd Generation Partnership Project (3GPP) term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrums as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a wireless communication device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, etc. A UE may be able to communicate with various types of base stations and network equipment, including macro eNBs, small cell eNBs, relay base stations, and the like. A UE may also be able to communicate using different radio access technologies (RATs), such as a cellular RAT (e.g., an LTE/LTE-A RAT), a Wi-Fi RAT, or other RATs.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions.

In some examples, each communication link 125 may include at least one carrier, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may have multiple downlink CCs and at least one uplink CC for carrier aggregation. Carrier aggregation may be used with both FDD and TDD component carriers.

As shown in FIG. 1, the wireless communication system 100 may also include ProSe relays or ProSe relay candidates 135. The ProSe relay candidates may relay communications between a base station 105 and UE 115 when the UE 115 is operated outside the coverage area of any base station 105. Thus, for example, the ProSe relay candidate 135-a may relay communications between the out-of-coverage UE 115-a and the base station 105-a. In some examples, the ProSe relay candidates 135 may themselves be UEs. Communications between UEs 115 and ProSe relay candidates 135 may be made using a Device-to-Device (D2D) communication protocol, such as a PC5 communication protocol. LTE/LTE-A communications between ProSe relay candidates 135 and base stations 105 may be made over Universal Mobile Telecommunication System (UMTS) air interfaces, also known as Uu interfaces.

Figure 2:
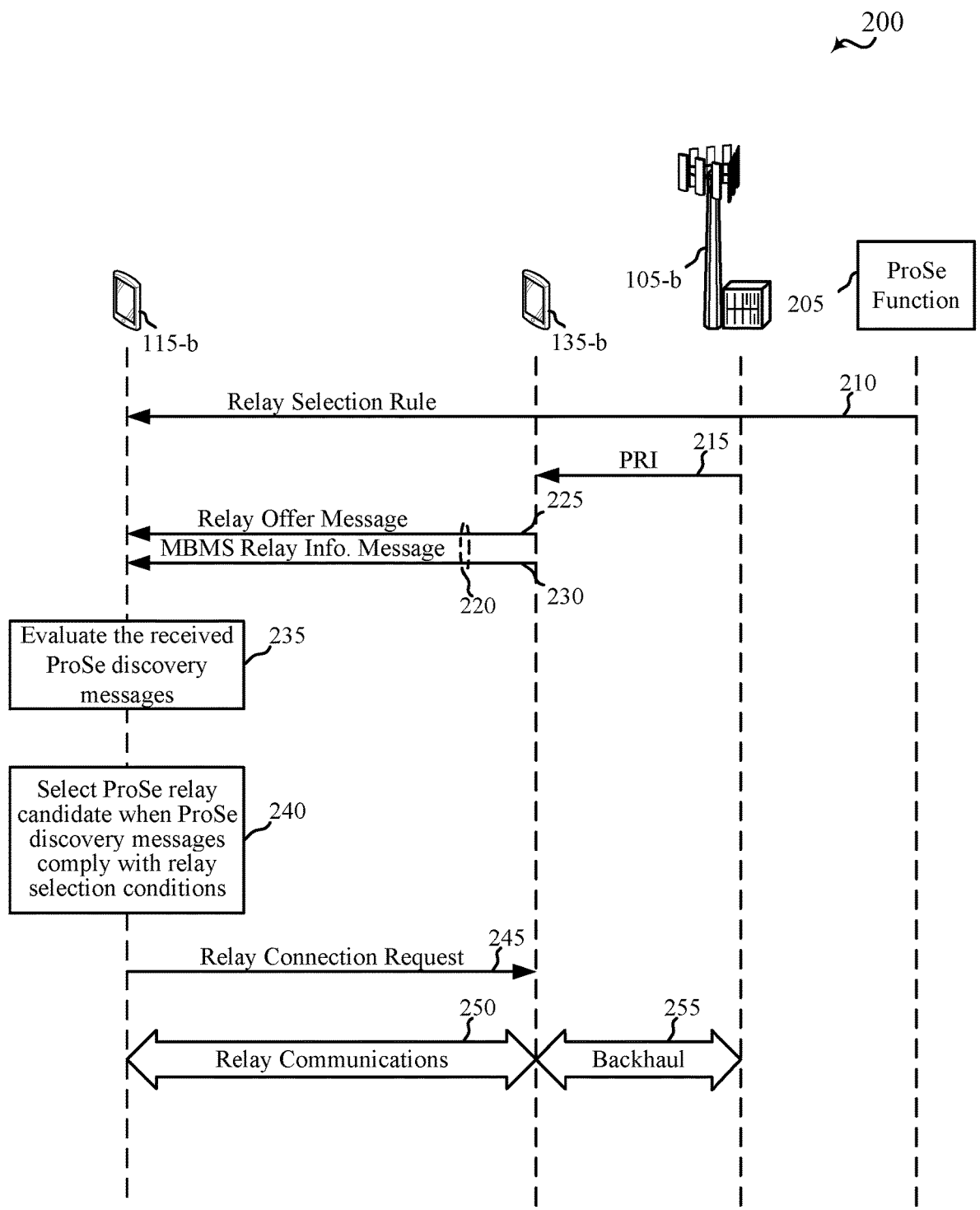
FIG. 2 is a swim lane diagram illustrating selection of a proximity services (ProSe) relay candidate, in accordance with various aspects of the present disclosure.

FIG. 2 is a swim lane diagram 200 illustrating selection of a ProSe relay candidate, in accordance with various aspects of the present disclosure. By way of example, the communications shown in FIG. 2 occur between a ProSe function 205, a base station 105-b, a ProSe relay candidate 135-b, and a UE 115-b. The base station 105-b, ProSe relay candidate 135-b, and UE 115-b may be respective examples of aspects of the base stations 105, ProSe relay candidates 135, and UEs 115 described with reference to FIG. 1.

At 210, the ProSe function may configure the UE 115-*b* with a relay selection rule (e.g., configure the UE to evaluate the relay selection rule). In some examples, the ProSe function may be provided by a server (e.g., a server of the core network 130 described with reference to FIG. 1).

In some embodiments, the relay selection rule may include at least one relay radio layer condition and/or at least one upper layer condition. The relay radio condition(s) may include, for example, a threshold relay-to-network reference signal received power (RSRP) (e.g., a threshold UuRSRP), a threshold relay-to-network reference signal received quality (RSRQ) (e.g., a threshold UuRSRQ), a threshold relay-to-UE RSRP (e.g., a threshold PC5RSRP), a provisioned ProSe Relay Indication (PRI) indicating a relay selection policy for accessing a network, a radio validity condition, or a combination thereof. The radio validity condition may include a first radio validity condition indicating that each threshold condition of the at least one relay radio layer condition needs to be satisfied, or a second radio validity condition indicating that at least one threshold condition of the at least one relay radio layer condition needs to be satisfied. The upper layer condition(s) may include, for example, a public land mobile network identifier (PLMN ID) indicating a relay Home PLMN (HPLMN) that the UE 115-*b* is allowed to connect to, a ProSe Relay UE ID, relay connectivity information, relay status information, an indicator of service continuity support, or a combination thereof.

At 215, the base station 105-*b* may transmit a PRI to the ProSe relay candidate 135-*b*. The PRI may include a bitmap (i.e., a one-dimensional bit array) that may be used by UEs to determine whether they should select the ProSe relay candidate 135-*b* for communicating with a network to which the base station 105-*b* provides access. The meaning of each bit in the PRI may be operator specific. In some examples, the PRI may be received in a system information block (SIB) or a unicast RRC message.

At 220, the ProSe relay candidate 135-*b* may broadcast at least one ProSe discovery message 220 (e.g., in accordance with PC5-D discovery techniques). The at least one ProSe discovery message 220 may include a relay offer message 225 and/or a Multimedia Broadcast Multicast Service (MBMS) relay information message 230. The relay offer message 225 may include at least one relay radio layer condition and/or at least one upper layer condition. The relay radio condition(s) may include, for example, a relay-to-network RSRP, a relay-to-network RSRQ, a PRI of the ProSe relay candidate 135-*b*, or a combination thereof. The upper layer condition(s) may include, for example, a PLMN ID, a ProSe Relay UE ID, relay connectivity information, relay status information, an indicator of service continuity support, or a combination thereof. The MBMS relay information message 230 may identify MBMSs offered by the ProSe relay candidate 135-*b*. Although not shown in FIG. 2, the UE 115-*b* may also receive ProSe discovery messages from other ProSe relay candidates.

At block 235, the UE 115-*b* may evaluate the received ProSe discovery messages with respect to the relay selection rule received at 210. In some embodiments, the UE 115-*b* may evaluate the received ProSe discovery messages to identify one or more ProSe discovery messages that comply with the relay selection rule (e.g., the UE 115-*b* may identify a first ProSe discovery message of a first ProSe relay candidate (e.g., the ProSe relay candidate 135-*b*), which first ProSe discovery message complies with the relay selection rule). In other embodiments, the UE 115-*b* may evaluate more than one (or all) of the received ProSe discovery messages and identify a ProSe discovery message received from one of the ProSe relay candidates (e.g., the ProSe relay candidate 135-*b*) as complying with the relay selection rule to a greater extent than at least one other ProSe discovery message received from at least one other ProSe relay candidate. The UE 115-*b* may also identify a ProSe discovery message that complies with the relay selection rule better than any other discover message.

At block 240, the UE 115-*b* may select a ProSe relay candidate (e.g., the ProSe relay candidate 135-*b*) for communicating with the network, based at least in part on the evaluations performed at block 235. At 245, the UE may transmit a relay connection request to the ProSe relay candidate 135-*b*. Upon acceptance of the relay connection request by the ProSe relay candidate 135-*b*, the UE 115-*b* may engage in communications with the network via relay communications 250 with the ProSe relay candidate 135-*b* and backhaul communications 255 between the ProSe relay candidate 135-*b* and the base station 105-*b*.

Figure 3:
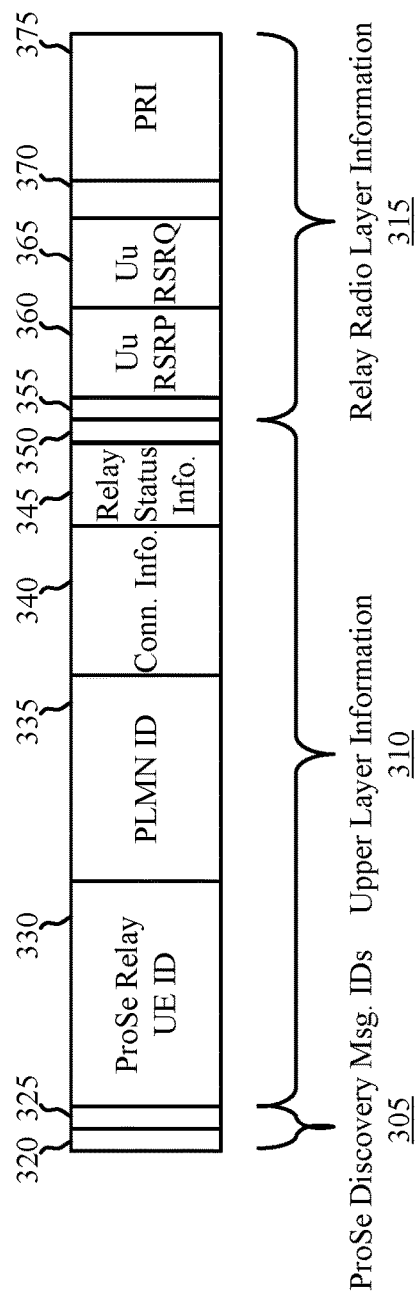
FIG. 3 shows an exemplary structure of a relay offer message, in accordance with various aspects of the present disclosure.

FIG. 3 shows an exemplary structure of a relay offer message 300, in accordance with various aspects of the present disclosure. The relay offer message 300 may be an example of a relay offer message transmitted by one of the ProSe relay candidates 135 described with reference to FIG. 1 or 2.

The relay offer message 300 may include a number of ProSe discovery message identifiers (IDs) 305, a number of upper layer conditions 310, or a number of relay radio layer conditions 315. The ProSe discovery message IDs 305 may include types of identifiers that are common to all ProSe discovery messages, and may include, for example, a message type 320 and a discovery type 325. In accordance with 3GPP Specification TS 24.334, and by way of example, the message type 320 may be an announcement (Model A) or a solicitation/response (Model B). Also in accordance with 3GPP, and by way of further example, the discovery type 325 may indicate whether a ProSe discovery message is a UE-to-network relay discovery message or a group member discovery message.

The upper layer conditions 310 may be specific to relay offer messages and may include, for example, a ProSe Relay UE ID 330, a PLMN ID 335, relay connectivity information 340, relay status information 345, or an indicator of service continuity support 350. The ProSe Relay UE ID 330 may be a link layer identifier used for direct communication, and may be associated with a packet data network (PDN) connection the ProSe relay candidate has established. The PLMN ID 335 may identify the PLMN to which radio frequencies used on a communication link established with a UE belong. If the radio frequencies are shared between multiple PLMNs, or not allocated to any PLMN, the PLMN ID 335 may be configured by the ProSe relay candidate's HPLMN. The relay connectivity information 340 may include a parameter identifying connectivity that the ProSe relay candidate provides (e.g., assigned access point name (APN) information). Because APN information can be long (e.g., 2000 bits), the relay connectivity information 340 may include an encoded index to APN information, to reduce its size. The relay status information 345 may include status or maintenance flags indicating, for example, whether the ProSe relay candidate is temporarily without connectivity or has low battery power. The relay status information 345 may enable a UE considering the ProSe relay candidate to pass on the ProSe relay candidate or seek/reselect another ProSe relay candidate. The indicator of service continuity support 350 may indicate whether the ProSe relay candidate is capable of providing service continuity.

The relay radio layer conditions 315 may include, for example, a backhaul type 355, a relay-to-network RSRP 360 (e.g., a UuRSRP), a relay-to-network RSRQ 365 (e.g., a UuRSRQ), a system bandwidth indicator 370, or a PRI 375. The backhaul type 355 may indicate a radio access technology (RAT) used for relay backhaul. The relay-to-network RSRP 360 may include a UuRSRP measured by the ProSe relay candidate (e.g., an LTE/LTE-A Uu Qrxlevmeas in RRC_IDLE, or a PCell RSRP in RRC_CONNECTED, as defined in 3GPP Specifications TS 36.304 and TS 36.331). The relay-to-network RSRQ 365 may include a UuRSRQ measured by the ProSe relay candidate (e.g., an LTE/LTE-A Uu Qqualmeas in RRC_IDLE, or a PCell RSRQ in RRC_CONNECTED, as defined in 3GPP Specifications TS 36.304 and TS 36.331). The system bandwidth indicator 370 may indicate a bandwidth between the ProSe relay candidate and the network. The PRI 375 may be provided to the ProSe relay candidate by the network and indicate a relay selection policy for accessing the network. The PRI 375 may include a bitmap (i.e., a one-dimensional bit array) that may be used by UEs to determine whether they should select the ProSe relay candidate for communicating with the network. The meaning of each bit in the PRI 375 may be operator specific.

Figure 4:
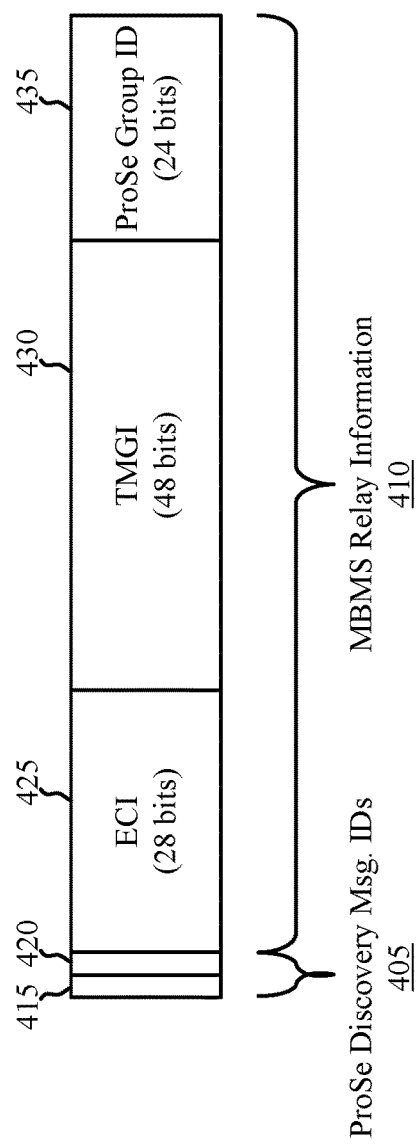
FIG. 4 shows an exemplary structure of a Multimedia Broadcast Multicast Service (MBMS) relay information message, in accordance with various aspects of the present disclosure.

FIG. 4 shows an exemplary structure of an MBMS relay information message 400, in accordance with various aspects of the present disclosure. The MBMS relay information message 400 may be an example of an MBMS relay information message transmitted by one of the ProSe relay candidates 135 described with reference to FIG. 1 or 2.

The MBMS relay information message 400 may include a number of ProSe discovery message identifiers (IDs) 405 or MBMS relay information 410. The ProSe discovery message IDs 405 may include types of identifiers that are common to all ProSe discovery messages, and may include, for example, a message type 415 and a discovery type 420. In accordance with 3GPP Specification TS 24.334, and by way of example, the message type 415 may be an announcement (Model A) or a solicitation/response (Model B). Also in accordance with 3GPP, and by way of further example, the discovery type 420 may indicate whether a ProSe discovery message is a UE-to-network relay discovery message or a group member discovery message.

The MBMS relay information 410 may be specific to MBMS relay information messages and may include, for example, an E-UTRAN cell identity (ECI) 425, at least one temporary mobile group identity (TMGI) 430, or at least one ProSe Group ID 435. The ECI 425 may identify the Cell ID of the cell on which the ProSe relay candidate is camped or connected. The ECI 425 may be used by a UE to report location information (e.g., in order to enable counting of UEs participating in Group Communication System Enablers (GCSE) or Mission Critical Push to Talk (MCPTT) services, to trigger an eMBMS session start). The at least one TMGI 430 may indicate the TMGI(s) of MBMS(s) that the ProSe relay candidate is currently serving. The at least one ProSe Group ID 435 may indicate Group ID(s) corresponding to respective ones of the TMGI(s) 430.

Figure 5:
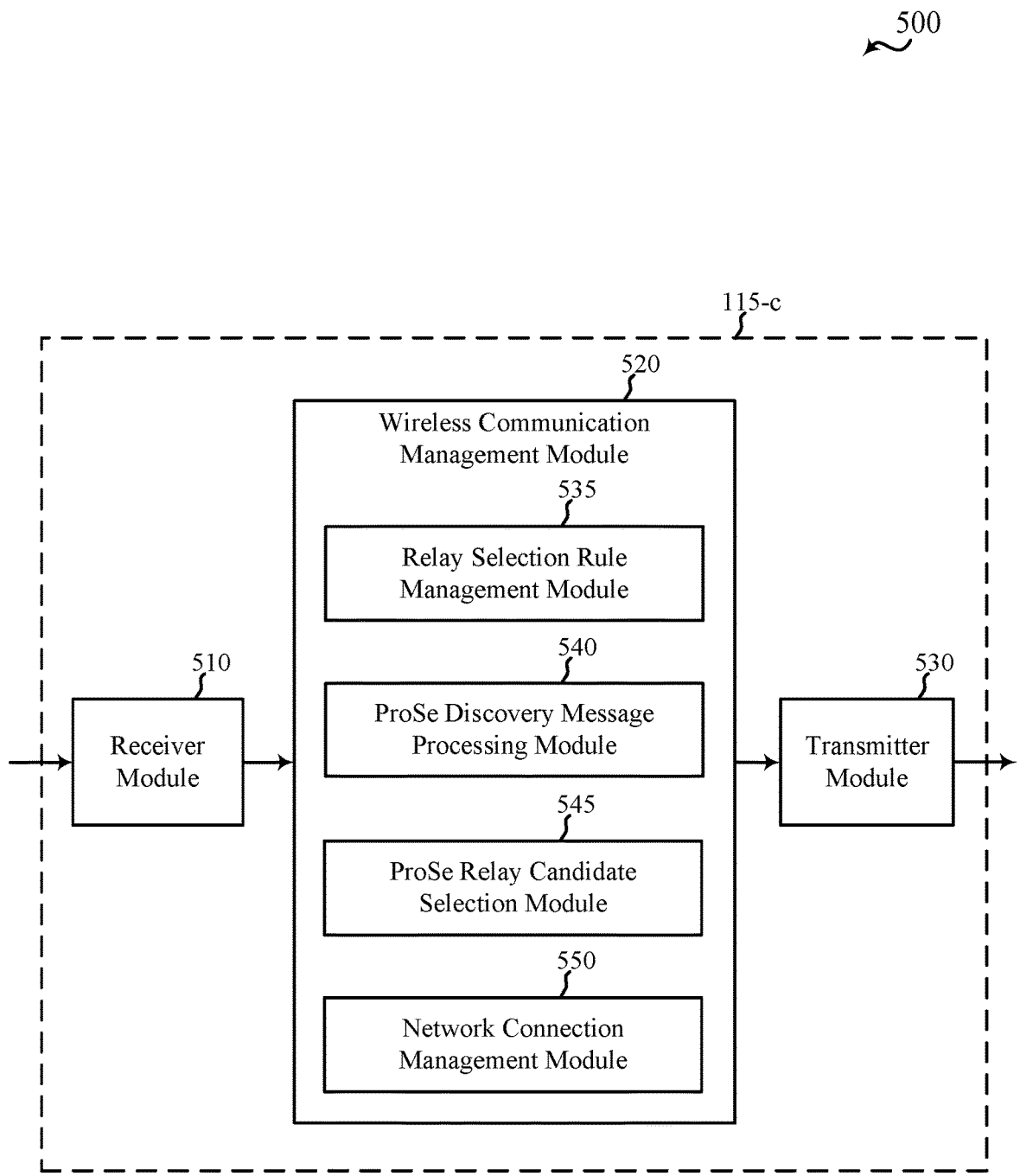
FIG. 5 shows a block diagram of a device for use in wireless communication, in accordance with various aspects of the present disclosure.

FIG. 5 shows a block diagram 500 of a device 115-c for use in wireless communication, in accordance with various aspects of the present disclosure. The device 115-c may be an example of aspects of one or more of the UEs 115 described with reference to FIG. 1 or 2. The device 115-c may also be or include a processor. The device 115-c may include a receiver module 510, a wireless communication management module 520, or a transmitter module 530. Each of these components may be in communication with each other.

The components of the device 115-c may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 510 may include at least one radio frequency (RF) receiver. The receiver module 510 or RF receiver may be used to receive various types of data or control signals (i.e., transmissions) over one or more communication links of a wireless communication system, such as one or more communication links of the wireless communication system 100 described with reference to FIG. 1. In some examples, the transmissions may include D2D communications and/or LTE/LTE-A communications.

In some examples, the transmitter module 530 may include at least one RF transmitter. The transmitter module 530 or RF transmitter may be used to transmit various types of data or control signals (i.e., transmissions) over one or more communication links of a wireless communication system, such as one or more communication links of the wireless communication system 100 described with reference to FIG. 1. In some examples, the transmissions may include D2D communications and/or LTE/LTE-A communications.

The wireless communication management module 520 may be used to manage one or more aspects of wireless communication for the device 115-c. In some examples, the wireless communication management module 520 may include a relay selection rule management module 535, a ProSe discovery message processing module 540, a ProSe relay candidate selection module 545, or a network connection management module 550.

The relay selection rule management module 535 may be used to receive a relay selection rule. In some examples, the relay selection rule may be received from a ProSe function that configures the device 115-c in accordance with the relay selection rule (e.g., configures the ProSe discovery message processing module 540 to evaluate the relay selection rule). In some examples, the ProSe function may be provided by a server (e.g., a server of the core network 130 described with reference to FIG. 1).

The ProSe discovery message processing module 540 may be used to receive at least one ProSe discovery message from each of a plurality of ProSe relay candidates. Each of the ProSe relay candidates may provide access to a network. The ProSe discovery message processing module 540 may also be used to evaluate the received ProSe discovery messages with respect to the relay selection rule. In some embodiments, the ProSe discovery message processing module 540 may evaluate the received ProSe discovery messages to identify one or more ProSe discovery messages that comply with the relay selection rule (e.g., the ProSe discovery message processing module 540 may identify a first ProSe discovery message of a first ProSe relay candidate, which first ProSe discovery message complies with the relay selection rule). In other embodiments, the ProSe discovery message processing module 540 may evaluate more than one (or all) of the received ProSe discovery messages and identify a ProSe discovery message received from one of the ProSe relay candidates (e.g., the first ProSe relay candidate) as complying with the relay selection rule to a greater extent than at least one other ProSe discovery message received from at least one other ProSe relay candidate. The ProSe discovery message processing module 540 may also identify a ProSe discovery message that complies with the relay selection rule better than any other discover message.

The ProSe relay candidate selection module 545 may be used to select a first ProSe relay candidate from the plurality of ProSe relay candidates based at least in part on the evaluating done by the ProSe discovery message processing module 540.

The network connection management module 550 may be used to connect a UE include the device 115-*c* to the network via the first ProSe relay candidate.

Figure 6:
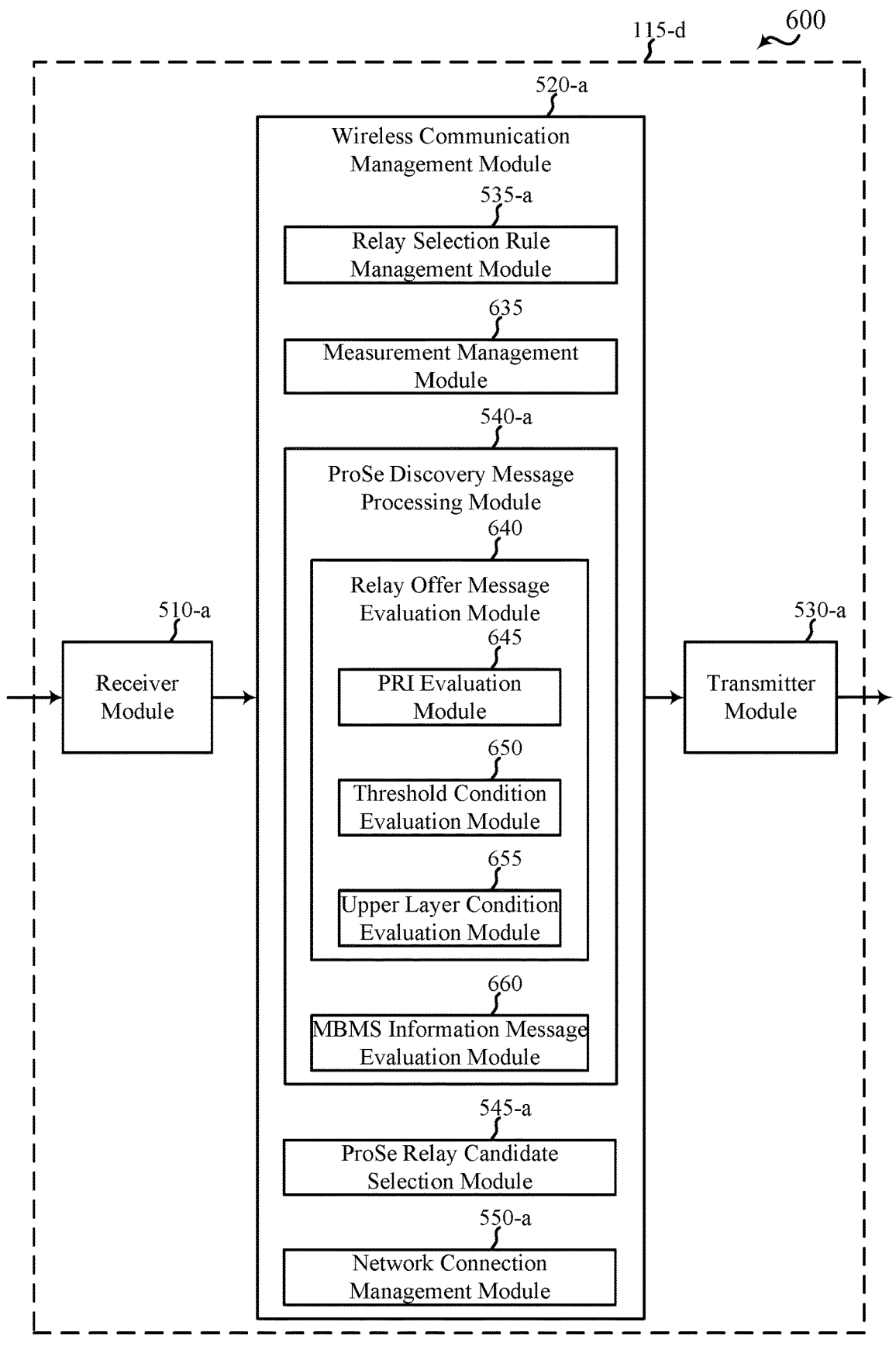
FIG. 6 shows a block diagram of a device for use in wireless communication, in accordance with various aspects of the present disclosure.

FIG. 6 shows a block diagram 600 of a device 115-*d* for use in wireless communication, in accordance with various aspects of the present disclosure. The device 115-*d* may be an example of aspects of one or more of the UEs or devices 115 described with reference to FIG. 1, 2, or 5. The device 115-*d* may also be or include a processor. The device 115-*d* may include a receiver module 510-*a*, a wireless communication management module 520-*a*, or a transmitter module 530-*a*, which may be respective examples of the receiver module 510, the wireless communication management module 520, and the transmitter module 530 described with reference to FIG. 5. Each of these components may be in communication with each other.

The components of the device 115-*d* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each module may also be implemented, in whole or in part, with instructions embodied in a memory, formatted to be executed by one or more general or application-specific processors.

The wireless communication management module 520-*a* may be used to manage one or more aspects of wireless communication for the device 115-*d*. In some examples, the wireless communication management module 520-*a* may include a relay selection rule management module 535-*a*, a ProSe discovery message processing module 540-*a*, a measurement management module 635, a ProSe relay candidate selection module 545-*a*, or a network connection management module 550-*a*.

The relay selection rule management module 535-*a* may be used to receive a relay selection rule. In some examples, the relay selection rule may be received from a ProSe function that configures the device 115-*d* in accordance with the relay selection rule (e.g., configures the ProSe discovery message processing module 540-*a* to evaluate the relay selection rule). In some examples, the ProSe function may be provided by a server (e.g., a server of the core network 130 described with reference to FIG. 1).

In some embodiments, the relay selection rule may include at least one relay radio layer condition and/or at least one upper layer condition. The relay radio condition(s) may include, for example, a threshold relay-to-network RSRP, a threshold relay-to-network RSRQ, a threshold relay-to-UE RSRP, a provisioned PRI indicating a relay selection policy for accessing a network, a radio validity condition, or a combination thereof. The radio validity condition may include a first radio validity condition indicating that each threshold condition of the at least one relay radio layer condition needs to be satisfied, or a second radio validity condition indicating that at least one threshold condition of the at least one relay radio layer condition needs to be satisfied. The upper layer condition(s) may include, for example, a PLMN ID, a ProSe Relay UE ID, relay connectivity information, relay status information, an indicator of service continuity support, or a combination thereof The measurement management module 635 may be used to measure a relay-to-UE RSRP (e.g., a ProSe relay candidate-to-UE RSRP).

The ProSe discovery message processing module 540-*a* may be used to receive at least one ProSe discovery message from each of a plurality of ProSe relay candidates. Each of the ProSe relay candidates may provide access to a network. In some embodiments, the at least one ProSe discovery message may include a relay offer message and/or a MBMS relay information message. The relay offer message may include at least one relay radio layer condition and/or at least one upper layer condition. The relay radio condition(s) may include, for example, a relay-to-network RSRP, a relay-to-network RSRQ, a PRI of the ProSe relay candidate, or a combination thereof. The upper layer condition(s) may include, for example, a PLMN ID, a ProSe Relay UE ID, relay connectivity information, relay status information, an indicator of service continuity support, or a combination thereof. The MBMS relay information message may identify MBMSs offered by the ProSe relay candidate.

The ProSe discovery message processing module 540-*a* may include a relay offer message evaluation module 640 or an MBMS relay information message evaluation module 660. The relay offer message evaluation module 640 may be used to evaluate the relay offer message with respect to the relay selection rule and include a PRI evaluation module 645, a threshold condition evaluation module 650, and an upper layer condition evaluation module 655. The relay offer message evaluation module 640 may be configured to evaluate the at least one relay radio layer condition with respect to the relay selection rule first, and to evaluate the at least one upper layer condition with respect to the relay selection rule upon determining a compliance of the at least one relay radio layer condition with the relay selection rule. Alternatively, the relay offer message evaluation module 640 may be configured to evaluate the at least one upper layer condition with respect to the relay selection rule first, and to evaluate the at least one relay radio layer condition with respect to the relay selection rule upon determining a compliance of the at least one upper layer condition with the relay selection rule.

The PRI evaluation module 645 may be used to perform a bitwise logical AND between the provisioned PRI of the relay selection rule and a PRI received in a relay offer message (e.g., in a ProSe discovery message). When the bitwise logical AND evaluates to TRUE, the ProSe discovery message processing module 540-*a* may consider the PRI to comply with the relay selection rule, and the evaluation of ProSe discovery messages corresponding to a ProSe relay candidate may pass to the threshold condition evaluation module 650. When the bitwise logical AND evaluates to FALSE, the ProSe discovery message processing module 540-*a* may consider the PRI to not comply with the relay selection rule, and if one or more other ProSe relay candidates are available, ProSe discovery messages corresponding to one or more additional ProSe relay candidates may be evaluated.

The threshold condition evaluation module 650 may be used to respectively compare a relay-to-network RSRP and relay-to-network RSRQ received in a relay offer message, if present, to a threshold relay-to-network RSRP and threshold relay-to-network RSRQ, if present, specified by the relay selection rule. When a value satisfies its threshold, the ProSe discovery message processing module 540-*a* may consider the value to comply with the relay selection rule. When a value does not satisfy its threshold, the ProSe discovery message processing module 540-*a* may consider the value to not comply with the relay selection rule. The threshold condition evaluation module 650 may also compare the measured relay-to-UE RSRP to a threshold relay-to-UE RSRP, if present, specified by the relay selection rule. When the measured value satisfies the threshold, the ProSe discovery message processing module 540-*a* may consider the measured value to comply with the relay selection rule. When the measured value does not satisfy the threshold, the ProSe discovery message processing module 540-*a* may consider the measured value to not comply with the relay selection rule. Still further, the threshold condition evaluation module 650 may be used to determine whether a radio validity condition of the relay selection rule, if present, is satisfied. When it is determined that the radio validity condition is satisfied, the evaluation of ProSe discovery messages corresponding to a ProSe relay candidate may pass to the upper layer condition evaluation module 655. When it is determined that the radio validity condition is not satisfied, and if one or more other ProSe relay candidates are available, ProSe discovery messages corresponding to one or more additional ProSe relay candidates may be evaluated.

The upper layer condition evaluation module 655 may be used to compare the upper layer conditions indicated in a relay offer message to respective upper layer conditions specified by the relay selection rule, to enable the ProSe discovery message processing module 540-*a* to determine whether the upper layer conditions indicated in the relay offer message comply with the relay selection rule. When it is determined that the upper layer conditions indicated in the relay offer message comply with the relay selection rule, the evaluation of ProSe discovery messages corresponding to a ProSe relay candidate may pass to the MBMS relay information message evaluation module 660. When it is determined that the upper layer conditions indicated in the relay offer message do not comply with the relay selection rule, and if one or more other ProSe relay candidates are available, ProSe discovery messages corresponding to one or more additional ProSe relay candidates may be evaluated.

The MBMS relay information message evaluation module 660 may be used to determine whether an MBMS relay information message corresponding to a ProSe relay candidate, if any, identifies at least one MBMS desired by a UE. When it is determined that the MBMS relay information message identifies at least one MBMS desired by the UE, the ProSe discovery message processing module 540-*a* may pass an identity of the ProSe relay candidate to the ProSe relay candidate selection module 545-*a*. When it is determined that the MBMS relay information message does not identify at least one MBMS desired by the UE, and if one or more other ProSe relay candidates are available, ProSe discovery messages corresponding to one or more additional ProSe relay candidates may be evaluated.

The ProSe relay candidate selection module 545-*a* may be used to select a ProSe relay candidate based at least in part on the evaluations and identifications performed by the ProSe discovery message processing module 540-*a*.

The network connection management module 550-*a* may be used to connect a UE include the device 115-*d* to the network via the ProSe relay candidate.

In some examples, aspects of the devices 515 described with reference to FIGS. 5 and 6 may be combined.

Figure 7:
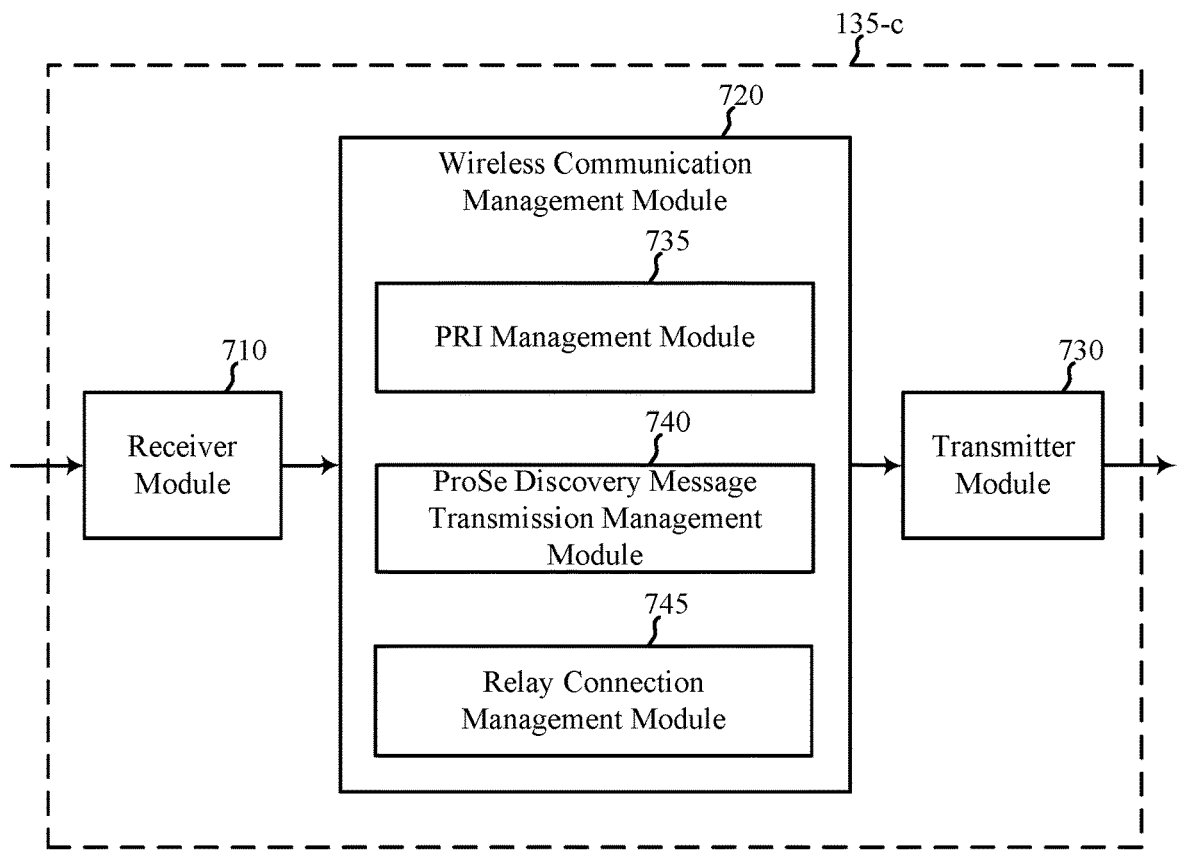
FIG. 7 shows a block diagram of a device for use in wireless communication, in accordance with various aspects of the present disclosure.

FIG. 7 shows a block diagram 700 of a device 135-*c* for use in wireless communication, in accordance with various aspects of the present disclosure. The device 135-*c* may be an example of aspects of one or more of the ProSe relay candidates 135 described with reference to FIG. 1 or 2. The device 135-*c* may also be or include a processor. The device 135-*c* may include a receiver module 710, a wireless communication management module 720, or a transmitter module 730. Each of these components may be in communication with each other.

The components of the device 135-*c* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 710 may include at least one RF receiver. The receiver module 710 or RF receiver may be used to receive various types of data or control signals (i.e., transmissions) over one or more communication links of a wireless communication system, such as one or more communication links of the wireless communication system 100 described with reference to FIG. 1. In some examples, the transmissions may include D2D communications and/or LTE/LTE-A communications.

In some examples, the transmitter module 730 may include at least one RF transmitter. The transmitter module 730 or RF transmitter may be used to transmit various types of data or control signals (i.e., transmissions) over one or more communication links of a wireless communication system, such as one or more communication links of the wireless communication system 100 described with reference to FIG. 1. In some examples, the transmissions may include D2D communications and/or LTE/LTE-A communications.

The wireless communication management module 720 may be used to manage one or more aspects of wireless communication for the device 135-*c*. In some examples, the wireless communication management module 720 may include a PRI management module 735, a ProSe discovery message transmission management module 740, or a relay connection management module 745.

The PRI management module 735 may be used to receive, from a network, a PRI. In some examples, the PRI may be received from a base station operating as a serving cell for a ProSe relay candidate including the device 135-*c*. In some examples, the PRI may be received in a SIB or a unicast RRC message.

The ProSe discovery message transmission management module 740 may be used to broadcast at least one ProSe discovery message that includes the PRI (e.g., in accordance with PC5-D discovery techniques). In some examples, the at least one ProSe discovery message may include a relay offer message and/or an MBMS relay information message. In some examples, the relay offer message may include at least one relay radio layer condition and/or at least one upper layer condition. The relay radio condition(s) may include, for example, a relay-to-network RSRP, a relay-to-network RSRQ, the PRI, or a combination thereof. The upper layer condition(s) may include, for example, a PLMN ID, a ProSe Relay UE ID, relay connectivity information, relay status information, an indicator of service continuity support, or a combination thereof. The MBMS relay information message may identify MBMSs offered by the ProSe relay candidate.

The relay connection management module 745 may be used to receive a relay connection request from a UE based at least in part on a compliance of the at least one ProSe discovery message with a relay selection rule of the UE.

Figure 8:
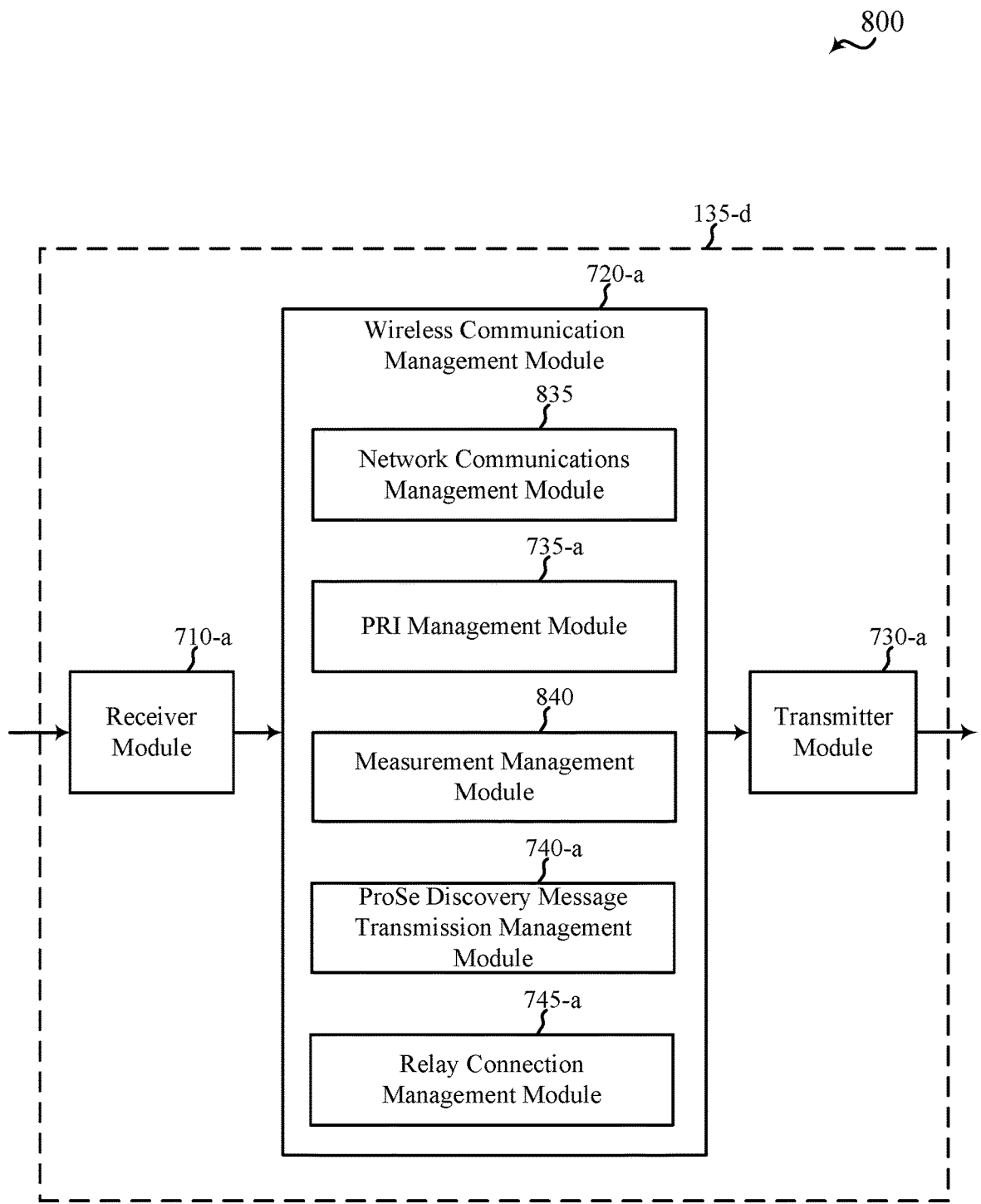
FIG. 8 shows a block diagram of a device for use in wireless communication, in accordance with various aspects of the present disclosure.

FIG. 8 shows a block diagram 800 of a device 135-d for use in wireless communication, in accordance with various aspects of the present disclosure. The device 135-d may be an example of aspects of one or more of the ProSe relay candidates or devices 135 described with reference to FIG. 1, 2, or 7. The device 135-d may also be or include a processor. The device 135-d may include a receiver module 710-a, a wireless communication management module 720-a, or a transmitter module 730-a, which may be respective examples of the receiver module 710, the wireless communication management module 720, and the transmitter module 730 described with reference to FIG. 7. Each of these components may be in communication with each other.

The components of the device 135-d may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each module may also be implemented, in whole or in part, with instructions embodied in a memory, formatted to be executed by one or more general or application-specific processors.

The wireless communication management module 720-a may be used to manage one or more aspects of wireless communication for the device 135-d. In some examples, the wireless communication management module 720-a may include a network communications management module 835, a PRI management module 735-a, a measurement management module 840, a ProSe discovery message transmission management module 740-a, or a relay connection management module 745-a.

The network communications management module 835 may be used to communicate with a network (e.g., with a base station of a network that operates as a serving cell for a ProSe relay candidate including the device 135-d).

The PRI management module 735-a may be used to receive, from a network, a PRI. In some examples, the PRI may be received from the base station that operates as the serving cell for the ProSe relay candidate including the device 135-d. In some examples, the PRI may be received in a SIB or a unicast RRC message.

The measurement management module 840 may be used to measure a relay-to-network RSRP, a relay-to-network RSRQ, or a combination thereof.

The ProSe discovery message transmission management module 740-a may be used to broadcast at least one ProSe discovery message that includes the PRI (e.g., in accordance with PC5-D discovery techniques). In some examples, the at least one ProSe discovery message may include a relay offer message and/or an MBMS relay information message. In some examples, the relay offer message may include at least one relay radio layer condition and/or at least one upper layer condition. The relay radio condition(s) may include, for example, an indicator of the measured relay-to-network RSRP, an indicator of the measured relay-to-network RSRQ, the PRI, or a combination thereof. The upper layer condition(s) may include, for example, a PLMN ID, a ProSe Relay UE ID, relay connectivity information, relay status information, an indicator of service continuity support, or a combination thereof. The MBMS relay information message may identify MBMSs offered by the ProSe relay candidate.

The relay connection management module 745-a may be used to receive a relay connection request from a UE based at least in part on a compliance of the at least one ProSe discovery message with a relay selection rule of the UE.

Figure 9:
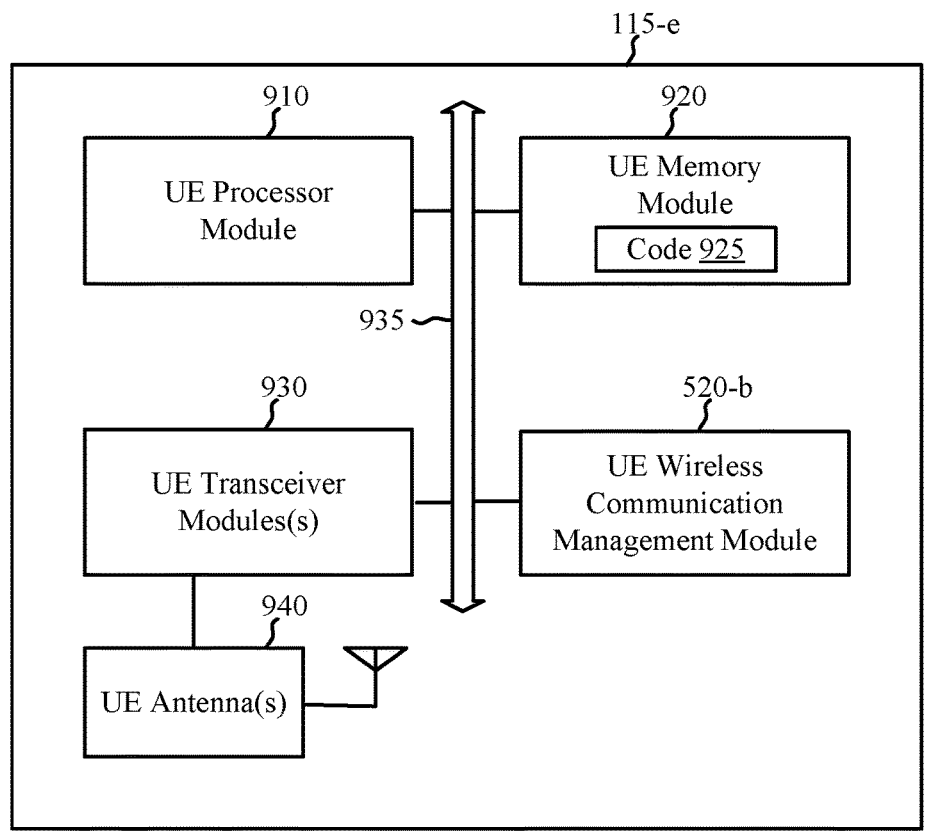
FIG. 9 shows a block diagram of a user equipment (UE) for use in wireless communication, in accordance with various aspects of the present disclosure.

FIG. 9 shows a block diagram 900 of a UE 115-e for use in wireless communication, in accordance with various aspects of the present disclosure. The UE 115-e may have various configurations and may be a wireless communication device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, etc. The UE 115-e may, in some examples, have an internal power supply (not shown), such as a small battery, to facilitate mobile operation. In some examples, the UE 115-e may be an example of aspects of one or more of the UEs or devices 115 described with reference to FIG. 1, 2, 5, or 6. The UE 115-e may be configured to implement at least some of the UE or device features and functions described with reference to FIGS. 1-6.

The UE 115-e may include a UE processor module 910, a UE memory module 920, at least one UE transceiver module (represented by UE transceiver module(s) 930), at least one UE antenna (represented by UE antenna(s) 940), or a UE wireless communication management module 520-b. Each of these components may be in communication with each other, directly or indirectly, over one or more buses 935.

The UE memory module 920 may include random access memory (RAM) or read-only memory (ROM). The UE memory module 920 may store computer-readable, computer-executable code 925 containing instructions that are configured to, when executed, cause the UE processor module 910 to perform various functions described herein related to wireless communication, including, for example, evaluating ProSe discovery messages received from each of a plurality of ProSe relay candidates with respect to a relay selection rule, selecting one of the ProSe relay candidates, and connecting to a network via the selected ProSe relay candidate. Alternatively, the code 925 may not be directly executable by the UE processor module 910 but be configured to cause the UE 115-e (e.g., when compiled and executed) to perform various of the functions described herein.

The UE processor module 910 may include an intelligent hardware device, e.g., a central processing unit (CPU), a microcontroller, an ASIC, etc. The UE processor module 910 may process information received through the UE transceiver module(s) 930 or information to be sent to the UE transceiver module(s) 930 for transmission through the UE antenna(s) 940. The UE processor module 910 may handle, alone or in connection with the UE wireless communication management module 520-b, various aspects of communicating over (or managing communications over) one or more communication links established with a ProSe relay candidate and/or one or more communication links with a base station.

The UE transceiver module(s) 930 may include a modem configured to modulate packets and provide the modulated packets to the UE antenna(s) 940 for transmission, and to demodulate packets received from the UE antenna(s) 940. The UE transceiver module(s) 930 may, in some examples, be implemented as one or more UE transmitter modules and one or more separate UE receiver modules. The UE transceiver module(s) 930 may support communications over one or more wireless channels. The UE transceiver module(s) 930 may be configured to communicate bi-directionally, via the UE antenna(s) 940, with one or more ProSe relay candidates, base stations, or other devices, such as one or more of the ProSe relay candidates 135, base stations 105, or devices 135 described with reference to FIG. 1, 2, 7, or 8. While the UE 115-e may include a single UE antenna, there may be examples in which the UE 115-e may include multiple UE antennas 940.

The UE wireless communication management module 520-b may be configured to perform or control some or all of the UE or device features or functions described with reference to FIGS. 1-6 related to connecting to a network via a ProSe relay candidate. The UE wireless communication management module 520-b, or portions of it, may include a processor, or some or all of the functions of the UE wireless communication management module 520-b may be performed by the UE processor module 910 or in connection with the UE processor module 910. In some examples, the UE wireless communication management module 520-b may be an example of the wireless communication management module 520 described with reference to FIG. 5 or 6.

Figure 10:
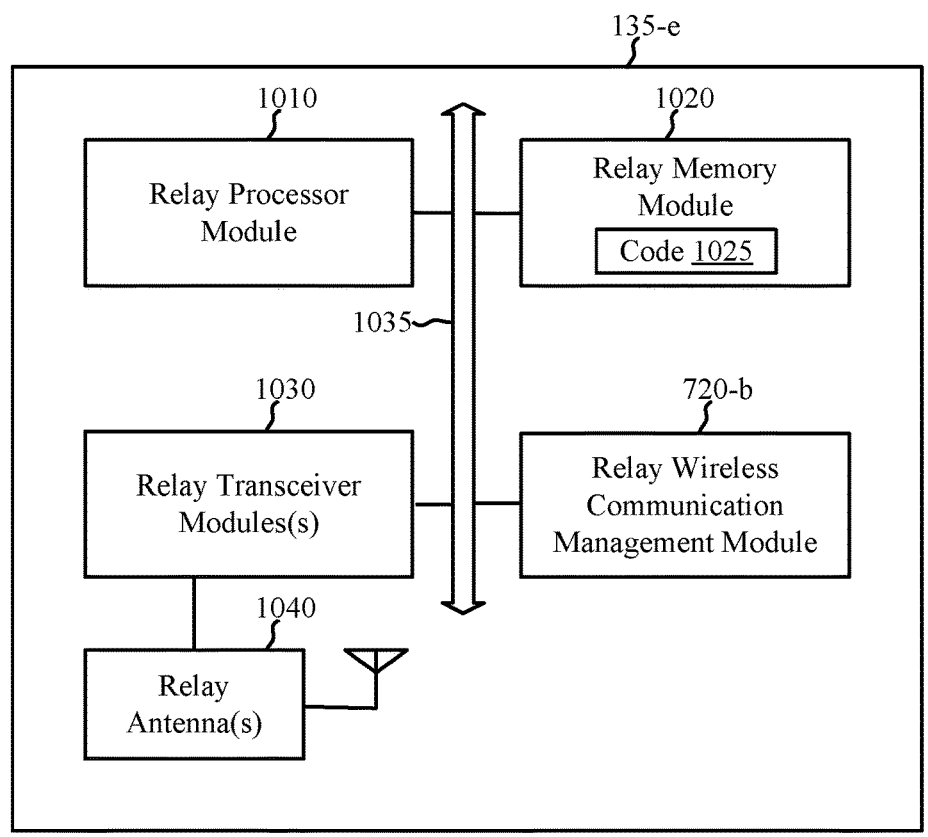
FIG. 10 shows a block diagram of a ProSe relay candidate for use in wireless communication, in accordance with various aspects of the present disclosure.

FIG. 10 shows a block diagram 1000 of a ProSe relay candidate 135-e for use in wireless communication, in accordance with various aspects of the present disclosure. The ProSe relay candidate 135-e may have various configurations, and in some examples may be a UE, such as one of the UEs 115 described with reference to FIG. 1, 2, 5, 6, or 9. The ProSe relay candidate 135-e may, in some examples, have an internal power supply (not shown), such as a small battery, to facilitate mobile operation. In some examples, the ProSe relay candidate 135-e may be an example of aspects of one or more of the ProSe relay candidates or devices 135 described with reference to FIG. 1, 2, 7, or 8. The ProSe relay candidate 135-e may be configured to implement at least some of the ProSe relay candidate or device features and functions described with reference to FIGS. 1-4, 7, and 8.

The ProSe relay candidate 135-e may include a relay processor module 1010, a relay memory module 1020, at least one relay transceiver module (represented by relay transceiver module(s) 1030), at least one relay antenna (represented by relay antenna(s) 1040), or a relay wireless communication management module 720-b. Each of these components may be in communication with each other, directly or indirectly, over one or more buses 1035.

The relay memory module 1020 may include RAM or ROM. The relay memory module 1020 may store computer-readable, computer-executable code 1025 containing instructions that are configured to, when executed, cause the relay processor module 1010 to perform various functions described herein related to wireless communication, including, for example, broadcasting at least one ProSe discovery message that includes a PRI, and providing relay services for one or more UEs based at least in part on a compliance of the at least one ProSe discovery message with a relay selection rule of each UE. Alternatively, the code 1025 may not be directly executable by the relay processor module 1010 but be configured to cause the ProSe relay candidate 135-e (e.g., when compiled and executed) to perform various of the functions described herein.

The relay processor module 1010 may include an intelligent hardware device, e.g., a CPU, a microcontroller, an ASIC, etc. The relay processor module 1010 may process information received through the relay transceiver module(s) 1030 or information to be sent to the relay transceiver module(s) 1030 for transmission through the relay antenna(s) 1040. The relay processor module 1010 may handle, alone or in connection with the relay wireless communication management module 720-b, various aspects of communicating over (or managing communications over) one or more communication links established with one or more UEs and one or more communication links established with a base station.

The relay transceiver module(s) 1030 may include a modem configured to modulate packets and provide the modulated packets to the relay antenna(s) 1040 for transmission, and to demodulate packets received from the relay antenna(s) 1040. The relay transceiver module(s) 1030 may, in some examples, be implemented as one or more relay transmitter modules and one or more separate relay receiver modules. The relay transceiver module(s) 1030 may support communications over one or more wireless channels. The relay transceiver module(s) 1030 may be configured to communicate bi-directionally, via the relay antenna(s) 1040, with one or more UEs, base stations, or other devices, such as one or more of the UEs 115, base stations 105, or devices 115 described with reference to FIG. 1, 2, 5, or 6. While the ProSe relay candidate 135-e may include a single relay antenna, there may be examples in which the ProSe relay candidate 135-e may include multiple relay antennas 1040.

The relay wireless communication management module 720-b may be configured to perform or control some or all of the ProSe relay candidate or device features or functions described with reference to FIGS. 1-4, 7, and 8 related to connecting a UE to a network via the ProSe relay candidate 135-e. The relay wireless communication management module 720-b, or portions of it, may include a processor, or some or all of the functions of the relay wireless communication management module 720-b may be performed by the relay processor module 1010 or in connection with the relay processor module 1010. In some examples, the relay wireless communication management module 720-b may be an example of the wireless communication management module 720 described with reference to FIG. 7 or 8.

Figure 11:
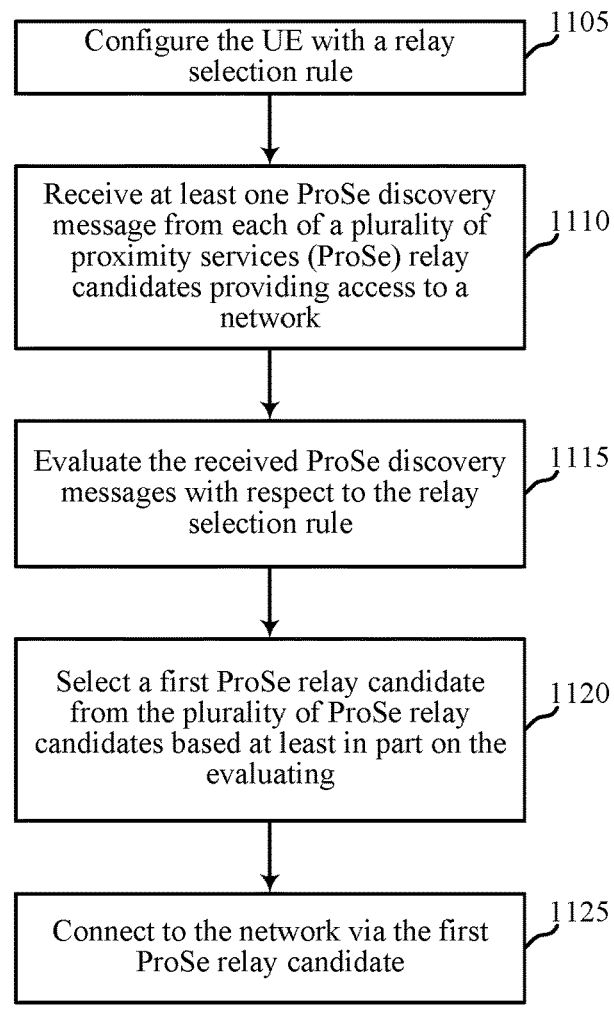
FIG. 11 is a flow chart illustrating an exemplary method for wireless communication at a UE, in accordance with various aspects of the present disclosure.

FIG. 11 is a flow chart illustrating an exemplary method 1100 for wireless communication at a UE, in accordance with various aspects of the present disclosure. For clarity, the method 1100 is described below with reference to aspects of one or more of the UEs or devices 115 described with reference to FIG. 1, 2, 5, 6, or 9. In some examples, a UE or device may execute one or more sets of codes to control the functional elements of the UE or device to perform the functions described below. Additionally or alternatively, the UE or device may perform one or more of the functions described below using special-purpose hardware.

At block 1105, a UE may be configured with a relay selection rule. In some examples, the relay selection rule may be received from a ProSe function that configures the UE in accordance with the relay selection rule (e.g., configures the UE to evaluate the relay selection rule). In some examples, the ProSe function may be provided by a server (e.g., a server of the core network 130 described with reference to FIG. 1). The operation(s) at block 1105 may be performed using the wireless communication management module 520 described with reference to FIG. 5, 6, or 9, or the relay selection rule management module 535 described with reference to FIG. 5 or 6.

At block 1110, the first UE may receive at least one ProSe discovery message from each of a plurality of ProSe relay candidates. Each of the ProSe relay candidates may provide access to a network. The operation(s) at block 1110 may be performed using the wireless communication management module 520 described with reference to FIG. 5, 6, or 9, or the ProSe discovery message processing module 540 described with reference to FIG. 5 or 6.

At block 1115, the UE may evaluate the received ProSe discovery messages with respect to the relay selection rule. In some embodiments, the UE may evaluate the received ProSe discovery messages to identify one or more ProSe discovery messages that comply with the relay selection rule (e.g., the UE may identify a first ProSe discovery message of a first ProSe relay candidate, which first ProSe discovery message complies with the relay selection rule). In other embodiments, the UE may evaluate more than one (or all) of the received ProSe discovery messages and identify a ProSe discovery message received from one of the ProSe relay candidates (e.g., the first ProSe relay candidate) as complying with the relay selection rule to a greater extent than at least one other ProSe discovery message received from at least one other ProSe relay candidate. The UE may also identify a ProSe discovery message that complies with the relay selection rule better than any other discover message. The operation(s) at block 1115 may be performed using the wireless communication management module 520 described with reference to FIG. 5, 6, or 9, or the ProSe discovery message processing module 540 described with reference to FIG. 5 or 6.

At block 1120, the UE may select a first ProSe relay candidate from the plurality of ProSe relay candidates based at least in part on the evaluating. The operation(s) at block 1120 may be performed using the wireless communication management module 520 described with reference to FIG. 5, 6, or 9, or the ProSe relay candidate selection module 545 described with reference to FIG. 5 or 6.

At block 1125, the UE may connect to the network via the first ProSe relay candidate. The operation(s) at block 1125 may be performed using the wireless communication management module 520 described with reference to FIG. 5, 6, or 9, or the network connection management module 550 described with reference to FIG. 5 or 6.

Thus, the method 1100 may provide for wireless communication. It should be noted that the method 1100 is just one implementation and that the operations of the method 1100 may be rearranged or otherwise modified such that other implementations are possible.

Figure 12:
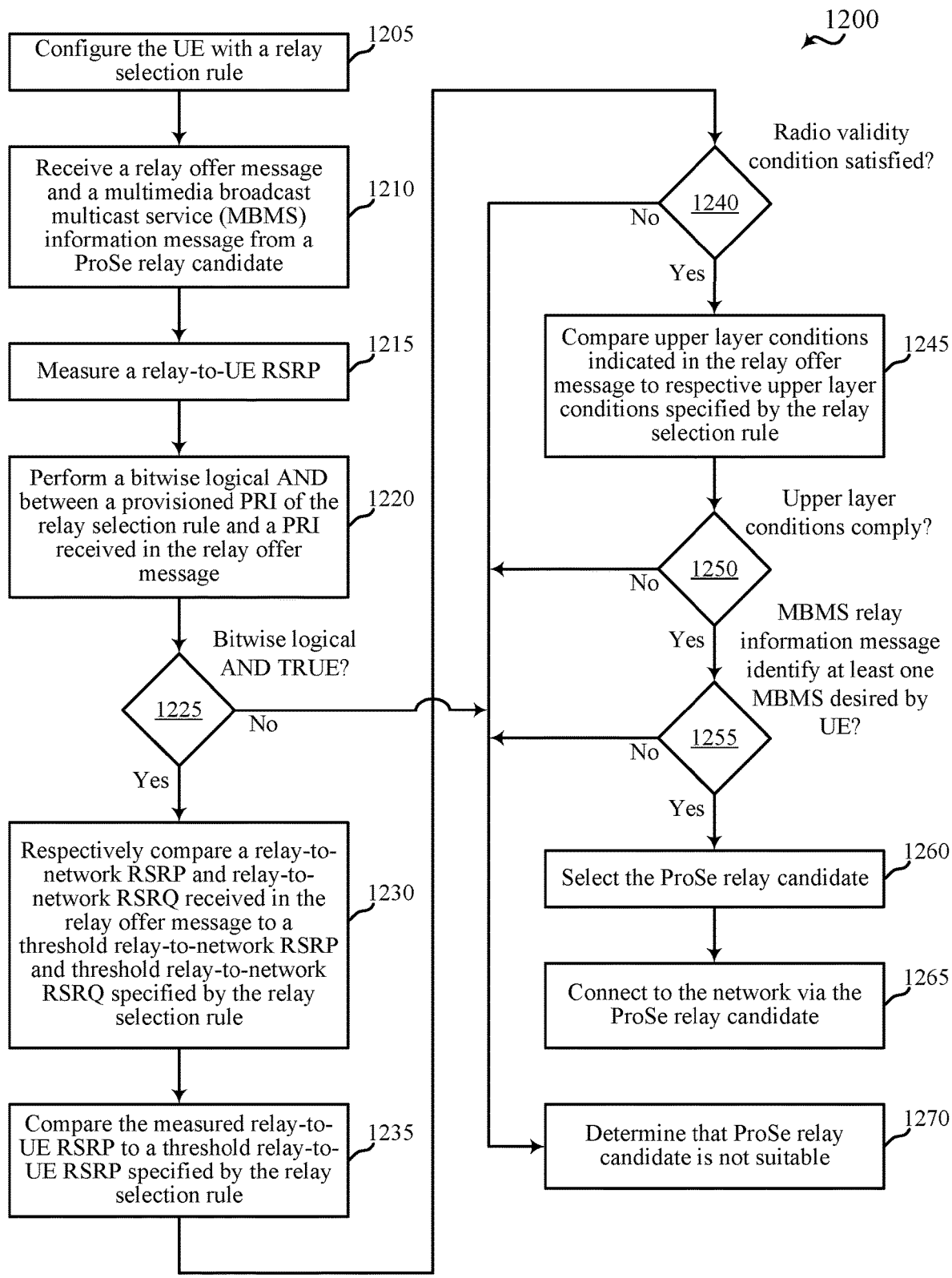
FIG. 12 is a flow chart illustrating an exemplary method for wireless communication at a UE, in accordance with various aspects of the present disclosure.

FIG. 12 is a flow chart illustrating an exemplary method 1200 for wireless communication at a UE, in accordance with various aspects of the present disclosure. For clarity, the method 1200 is described below with reference to aspects of one or more of the UEs or devices 115 described with reference to FIG. 1, 2, 5, 6, or 9. In some examples, a UE or device may execute one or more sets of codes to control the functional elements of the UE or device to perform the functions described below. Additionally or alternatively, the UE or device may perform one or more of the functions described below using special-purpose hardware.

At block 1205, a UE may be configured with a relay selection rule. In some examples, the relay selection rule may be received from a ProSe function that configures the UE in accordance with the relay selection rule (e.g., configures the UE to evaluate the relay selection rule). In some examples, the ProSe function may be provided by a server (e.g., a server of the core network 130 described with reference to FIG. 1). The operation(s) at block 1205 may be performed using the wireless communication management module 520 described with reference to FIG. 5, 6, or 9, or the relay selection rule management module 535 described with reference to FIG. 5 or 6.

In some embodiments, the relay selection rule may include at least one relay radio layer condition and/or at least one upper layer condition. The relay radio condition(s) may include, for example, a threshold relay-to-network RSRP, a threshold relay-to-network RSRQ, a threshold relay-to-UE RSRP, a provisioned PRI indicating a relay selection policy for accessing a network, a radio validity condition, or a combination thereof. The radio validity condition may include a first radio validity condition indicating that each threshold condition of the at least one relay radio layer condition needs to be satisfied, or a second radio validity condition indicating that at least one threshold condition of the at least one relay radio layer condition needs to be satisfied. The upper layer condition(s) may include, for example, a PLMN ID, a ProSe Relay UE ID, relay connectivity information, relay status information, an indicator of service continuity support, or a combination thereof At block 1210, the first UE may receive at least one ProSe discovery message from a ProSe relay candidate. The ProSe relay candidate may provide access to a network. The operation(s) at block 1210 may be performed using the wireless communication management module 520 described with reference to FIG. 5, 6, or 9, or the ProSe discovery message processing module 540 described with reference to FIG. 5 or 6.

In some embodiments, the at least one ProSe discovery message may include a relay offer message and/or a MBMS relay information message. The relay offer message may include at least one relay radio layer condition and/or at least one upper layer condition. The relay radio condition(s) may include, for example, a relay-to-network RSRP, a relay-to-network RSRQ, a PRI of the ProSe relay candidate, or a combination thereof. The upper layer condition(s) may include, for example, a PLMN ID, a ProSe Relay UE ID, relay connectivity information, relay status information, an indicator of service continuity support, or a combination thereof. The MBMS relay information message may identify MBMSs offered by the ProSe relay candidate.

At block 1215, the UE may measure a relay-to-UE RSRP (e.g., a ProSe relay candidate-to-UE RSRP. The operation(s) at block 1215 may be performed using the wireless communication management module 520 described with reference to FIG. 5, 6, or 9, or the measurement management module 635 described with reference to FIG. 6.

At blocks 1220, 1225, 1230, 1235, 1240, 1245, and/or 1250, the UE may evaluate the relay offer message with respect to the relay selection rule. By way of example, the method 1200 is configured to evaluate the at least one relay radio layer condition with respect to the relay selection rule first, and to evaluate the at least one upper layer condition with respect to the relay selection rule upon determining a compliance of the at least one relay radio layer condition with the relay selection rule. In an alternative embodiment, the method 1200 may be configured to evaluate the at least one upper layer condition with respect to the relay selection rule first, and to evaluate the at least one relay radio layer condition with respect to the relay selection rule upon determining a compliance of the at least one upper layer condition with the relay selection rule.

At block 1220, the UE may perform a bitwise logical AND between the provisioned PRI of the relay selection rule and the PRI received in the relay offer message (e.g., in the ProSe discovery messages). At block 1225, it may be determined whether the bitwise logical AND evaluated to TRUE. When it is determined that the bitwise logical AND evaluated to TRUE, the UE may consider the PRI to comply with the relay selection rule, and the method 1200 may continue at block 1230. When it is determined that the bitwise logical AND evaluated to FALSE, the UE may consider the PRI to not comply with the relay selection rule, and the method 1200 may continue at block 1270. The operation(s) at blocks 1220 and 1225 may be performed using the wireless communication management module 520 described with reference to FIG. 5, 6, or 9, the ProSe discovery message processing module 540 described with reference to FIG. 5 or 6, or the relay offer message evaluation module 640 or PRI evaluation module 645 described with reference to FIG. 6.

At block 1230, the UE may respectively compare a relay-to-network RSRP and relay-to-network RSRQ received in the relay offer message, if present, to a threshold relay-to-network RSRP and threshold relay-to-network RSRQ, if present, specified by the relay selection rule. When a value satisfies its threshold, the UE may consider the value to comply with the relay selection rule. When a value does not satisfy its threshold, the UE may consider the value to not comply with the relay selection rule. At block 1235, the UE may compare the measured relay-to-UE RSRP to a threshold relay-to-UE RSRP, if present, specified by the relay selection rule. When the measured value satisfies the threshold, the UE may consider the measured value to comply with the relay selection rule. When the measured value does not satisfy the threshold, the UE may consider the measured value to not comply with the relay selection rule.

At block 1240, the UE may determine whether a radio validity condition of the relay selection rule, if present, is satisfied. When it is determined that the radio validity condition is satisfied, the method 1200 may continue at block 1245. When it is determined that the radio validity condition is not satisfied, the method 1200 may continue at block 1270. The operation(s) at blocks 1230, 1235, and 1240 may be performed using the wireless communication management module 520 described with reference to FIG. 5, 6, or 9, the ProSe discovery message processing module 540 described with reference to FIG. 5 or 6, or the relay offer message evaluation module 640 or threshold condition evaluation module 650 described with reference to FIG. 6.

At block 1245, the UE may compare the upper layer conditions indicated in the relay offer message to respective upper layer conditions specified by the relay selection rule, and at block 1250, the UE may determine whether the upper layer conditions indicated in the relay offer message comply with the relay selection rule. When it is determined that the upper layer conditions indicated in the relay offer message comply with the relay selection rule, the method 1200 may continue at block 1255. When it is determined that the upper layer conditions indicated in the relay offer message do not comply with the relay selection rule, the method 1200 may continue at block 1270. The operation(s) at blocks 1245 and 1250 may be performed using the wireless communication management module 520 described with reference to FIG. 5, 6, or 9, the ProSe discovery message processing module 540 described with reference to FIG. 5 or 6, or the relay offer message evaluation module 640 or upper layer condition evaluation module 655 described with reference to FIG. 6.

At block 1255, the UE may determine whether the MBMS relay information message, if any, identifies at least one MBMS desired by the UE. When it is determined that the MBMS relay information message identifies at least one MBMS desired by the UE, the method 1200 may continue at block 1260. When it is determined that the MBMS relay information message does not identify at least one MBMS desired by the UE, the method 1200 may continue at block 1270. The operation(s) at block 1255 may be performed using the wireless communication management module 520 described with reference to FIG. 5, 6, or 9, the ProSe discovery message processing module 540 described with reference to FIG. 5 or 6, or the MBMS relay information message evaluation module 660 described with reference to FIG. 6.

At block 1260, the UE may select the ProSe relay candidate based at least in part on the evaluations performed at blocks 1220, 1225, 1230, 1235, 1240, 1245, and/or 1250, and based at least in part on the MBMS relay information message identifying the at least one MBMS desired by the UE (e.g., at block 1255). The operation(s) at block 1260 may be performed using the wireless communication management module 520 described with reference to FIG. 5, 6, or 9, or the ProSe relay candidate selection module 545 described with reference to FIG. 5 or 6.

At block 1265, the UE may connect to the network via the ProSe relay candidate. The operation(s) at block 1265 may be performed using the wireless communication management module 520 described with reference to FIG. 5, 6, or 9, or the network connection management module 550 described with reference to FIG. 5 or 6.

At block 1270, the UE may determine that the ProSe relay candidate is not a suitable ProSe relay candidate. If one or more other ProSe relay candidates are available, one or more additional ProSe relay candidates may be evaluated in accordance with the operations at blocks 1220, 1225, 1230, 1235, 1240, 1245, 1250, and/or 1255.

Thus, the method 1200 may provide for wireless communication. It should be noted that the method 1200 is just one implementation and that the operations of the method 1200 may be rearranged or otherwise modified such that other implementations are possible.

In some examples, aspects of the methods 1100 and 1200 described with reference to FIGS. 11 and 12 may be combined.

Figure 13:
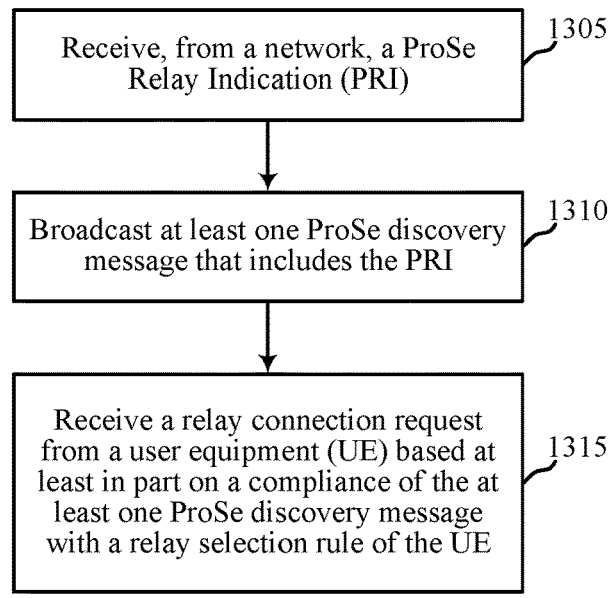
FIG. 13 is a flow chart illustrating an exemplary method for wireless communication at a ProSe relay candidate, in accordance with various aspects of the present disclosure.

FIG. 13 is a flow chart illustrating an exemplary method 1300 for wireless communication at a ProSe relay candidate, in accordance with various aspects of the present disclosure. For clarity, the method 1300 is described below with reference to aspects of one or more of the ProSe relay candidates or devices 135 described with reference to FIG. 1, 2, 7, 8, or 10. In some examples, a ProSe relay candidate or device may execute one or more sets of codes to control the functional elements of the ProSe relay candidate or device to perform the functions described below. Additionally or alternatively, the ProSe relay candidate or device may perform one or more of the functions described below using special-purpose hardware.

At block 1305, a ProSe relay candidate may receive, from a network, a PRI. In some examples, the PRI may be received from a base station operating as a serving cell for the ProSe relay candidate. In some examples, the PRI may be received in a SIB or a unicast RRC message. The operation(s) at block 1305 may be performed using the wireless communication management module 720 described with reference to FIG. 7, 8, or 10, or the PRI management module 735 described with reference to FIG. 7 or 8.

At block 1310, the ProSe relay candidate may broadcast at least one ProSe discovery message that includes the PRI (e.g., in accordance with PC5-D discovery techniques). In some examples, the at least one ProSe discovery message may include a relay offer message and/or an MBMS relay information message. In some examples, the relay offer message may include at least one relay radio layer condition and/or at least one upper layer condition. The relay radio condition(s) may include, for example, a relay-to-network RSRP, a relay-to-network RSRQ, the PRI, or a combination thereof. The upper layer condition(s) may include, for example, a PLMN ID, a ProSe Relay UE ID, relay connectivity information, relay status information, an indicator of service continuity support, or a combination thereof. The MBMS relay information message may identify MBMSs offered by the ProSe relay candidate. The operation(s) at block 1310 may be performed using the wireless communication management module 720 described with reference to FIG. 7, 8, or 10, or the ProSe discovery message transmission management module 740 described with reference to FIG. 7 or 8.

At block 1315, the ProSe relay candidate may receive a relay connection request from a UE based at least in part on a compliance of the at least one ProSe discovery message with a relay selection rule of the UE. The operation(s) at block 1315 may be performed using the wireless communication management module 720 described with reference to FIG. 7, 8, or 10, or the relay connection management module 745 described with reference to FIG. 7 or 8.

Thus, the method 1300 may provide for wireless communication. It should be noted that the method 1300 is just one implementation and that the operations of the method 1300 may be rearranged or otherwise modified such that other implementations are possible.

Figure 14:
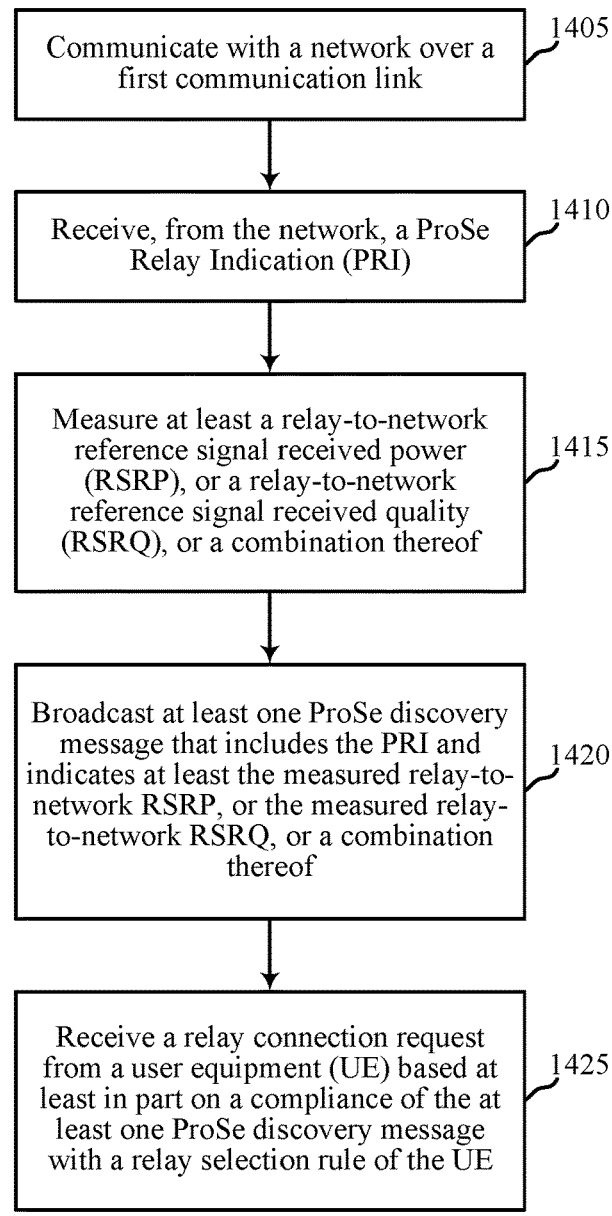
FIG. 14 is a flow chart illustrating an exemplary method for wireless communication at a ProSe relay candidate, in accordance with various aspects of the present disclosure.

FIG. 14 is a flow chart illustrating an exemplary method 1400 for wireless communication at a ProSe relay candidate, in accordance with various aspects of the present disclosure. For clarity, the method 1400 is described below with reference to aspects of one or more of the ProSe relay candidates or devices 135 described with reference to FIG. 1, 2, 7, 8, or 10. In some examples, a ProSe relay candidate or device may execute one or more sets of codes to control the functional elements of the ProSe relay candidate or device to perform the functions described below. Additionally or alternatively, the ProSe relay candidate or device may perform one or more of the functions described below using special-purpose hardware.

At block 1405, a ProSe relay candidate may communicate with a network (e.g., with a base station of the network that operates as a serving cell for the ProSe relay candidate). The operation(s) at block 1405 may be performed using the wireless communication management module 720 described with reference to FIG. 7, 8, or 10, or the network communications management module 835 described with reference to FIG. 8.

At block 1410, the ProSe relay candidate may receive, from the network, a PRI. In some examples, the PRI may be received from the base station that operates as the serving cell for the ProSe relay candidate. In some examples, the PRI may be received in a SIB or a unicast RRC message. The operation(s) at block 1410 may be performed using the wireless communication management module 720 described with reference to FIG. 7, 8, or 10, or the PRI management module 735 described with reference to FIG. 7 or 8.

At block 1415, the ProSe relay candidate may measure a relay-to-network RSRP, a relay-to-network RSRQ, or a combination thereof. The operation(s) at block 1415 may be performed using the wireless communication management module 720 described with reference to FIG. 7, 8, or 10, or the measurement management module 840 described with reference to FIG. 8.

At block 1420, the ProSe relay candidate may broadcast at least one ProSe discovery message that includes the PRI (e.g., in accordance with PC5-D discovery techniques). In some examples, the at least one ProSe discovery message may include a relay offer message and/or an MBMS relay information message. In some examples, the relay offer message may include at least one relay radio layer condition and/or at least one upper layer condition. The relay radio condition(s) may include, for example, an indicator of the measured relay-to-network RSRP, an indicator of the measured relay-to-network RSRQ, the PRI, or a combination thereof. The upper layer condition(s) may include, for example, a PLMN ID, a ProSe Relay UE ID, relay connectivity information, relay status information, an indicator of service continuity support, or a combination thereof. The MBMS relay information message may identify MBMSs offered by the ProSe relay candidate. The operation(s) at block 1420 may be performed using the wireless communication management module 720 described with reference to FIG. 7, 8, or 10, or the ProSe discovery message transmission management module 740 described with reference to FIG. 7 or 8.

At block 1425, the ProSe relay candidate may receive a relay connection request from a UE based at least in part on a compliance of the at least one ProSe discovery message with a relay selection rule of the UE. The operation(s) at block 1425 may be performed using the wireless communication management module 720 described with reference to FIG. 7, 8, or 10, or the relay connection management module 745 described with reference to FIG. 7 or 8.

Thus, the method 1400 may provide for wireless communication. It should be noted that the method 1400 is just one implementation and that the operations of the method 1400 may be rearranged or otherwise modified such that other implementations are possible.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A user equipment (UE) for wireless communication, comprising:
   a memory storing processor-executable code; and
   one or more processors coupled to the memory and individually or collectively operable to execute the code to cause the UE to:
      receive, from a network, a relay selection rule, the relay selection rule comprising a set of conditions, wherein the set of conditions comprises at least one relay radio layer condition and at least one upper layer condition, and wherein the set of conditions comprises a proximity services (ProSe) Relay UE identifier (ID), relay connectivity information, and a provisioned ProSe Relay Indication (PRI), the provisioned PRI indicating a relay selection policy for accessing the network;

receive, by the UE, at least one ProSe discovery message from each of a plurality of ProSe relay candidates providing access to a network, wherein the at least one ProSe discovery message comprises a Multimedia Broadcast Multicast Service (MBMS) relay information message which includes a temporary mobile group identity (TMGI) and a ProSe Group Identifier (ID) that corresponds to the TMGI, and wherein the at least one ProSe discovery message is indicative of one or more upper layer conditions;

evaluate, by the UE, the received at least one ProSe discovery message with respect to the relay selection rule;

select, by the UE, a first ProSe relay candidate from the plurality of ProSe relay candidates based at least in part on the evaluating and determining that one or more upper layer conditions associated with a ProSe discovery message of the first ProSe relay candidate from the plurality of ProSe relay candidates comply with the relay selection rule; and connect to the network via the first ProSe relay candidate.

2. The UE of claim 1, wherein, to evaluate the received at least one ProSe discovery message with respect to the relay selection rule, the one or more processors are individually or collectively operable to execute the code to cause the UE to:

identify the ProSe discovery message received from the first ProSe relay candidate as complying with the relay selection rule to a greater extent than at least one other ProSe discovery message received from at least one other ProSe relay candidate of the plurality of ProSe relay candidates based at least in part on determining that the one or more upper layer conditions associated with a ProSe discovery message of the first ProSe relay candidate from the plurality of ProSe relay candidates comply with the relay selection rule based at least in part on the evaluating.

3. The UE of claim 1, wherein the at least one ProSe discovery message comprises a relay offer message, and wherein, to evaluate the received at least one ProSe discovery message with respect to the relay selection rule, the one or more processors are individually or collectively operable to execute the code to cause the UE to:

evaluate the relay offer message with respect to the relay selection rule.

4. The UE of claim 3, wherein the one or more processors are further operable to execute the code to cause the UE to:

determine the MBMS relay information message identifies at least one MBMS desired by the UE; and further select the first ProSe relay candidate based at least in part on the MBMS relay information message identifying the at least one MBMS desired by the UE.

5. The UE of claim 4, wherein the MBMS relay information message also comprises at least a E-UTRAN cell identity (ECI).

6. The UE of claim 1, wherein the at least one relay radio layer condition comprises at least a threshold relay-to-network reference signal received power (RSRP), or a threshold relay-to-network reference signal received quality (RSRQ), a threshold relay-to-UE RSRP, or a radio validity condition, or a combination thereof.

7. The UE of claim 6, wherein the radio validity condition comprises at least a first radio validity condition indicating that each threshold condition of the at least one relay radio layer condition needs to be satisfied, or a second radio validity condition indicating that at least one threshold condition of the at least one relay radio layer condition needs to be satisfied.

8. The UE of claim 6, wherein the one or more processors are further operable to execute the code to cause the UE to:

perform a bitwise logical AND between the provisioned PRI and a PRI received in the ProSe discovery messages.

9. The UE of claim 6, wherein the one or more processors are further operable to execute the code to cause the UE to:

measure a relay-to-UE RSRP; and compare the measured relay-to-UE RSRP to the threshold relay-to-UE RSRP.

10. The UE of claim 1, wherein the at least one upper layer condition further comprises at least a public land mobile network identifier (PLMN ID), or relay status information, or an indicator of service continuity support, or a combination thereof.

11. The UE of claim 1, wherein the one or more processors are further operable to execute the code to cause the UE to:

determine a compliance of the at least one relay radio layer condition with the relay selection rule; and evaluate the at least one upper layer condition with respect to the relay selection rule based at least in part on the determining.

12. The UE of claim 1, wherein the one or more processors are further operable to execute the code to cause the UE to:

determine a compliance of the at least one upper layer condition with the relay selection rule; and evaluate the at least one relay radio layer condition with respect to the relay selection rule based at least in part on the determining.

13. The UE of claim 1, wherein the UE is configured according to the relay selection rule by a ProSe function.

14. A method for wireless communication at a user equipment (UE), comprising:

receiving, from a network, a relay selection rule, the relay selection rule comprising a set of conditions, wherein the set of conditions comprises at least one relay radio layer condition and at least one upper layer condition, and wherein the set of conditions comprises a proximity services (ProSe) Relay UE identifier (ID), relay connectivity information, and a provisioned ProSe Relay Indication (PRI), the provisioned PRI indicating a relay selection policy for accessing the network;

receiving, by the UE, at least one ProSe discovery message from each of a plurality of ProSe relay candidates providing access to a network, wherein the at least one ProSe discovery message comprises a Multimedia Broadcast Multicast Service (MBMS) relay information message which includes a temporary mobile group identity (TMGI) and a ProSe Group Identifier (ID) that corresponds to the TMGI, and wherein the at least one ProSe discovery message is indicative of one or more upper layer conditions;

evaluating, by the UE, the received at least one ProSe discovery message with respect to the relay selection rule;

selecting, by the UE, a first ProSe relay candidate from the plurality of ProSe relay candidates based at least in part on the evaluating and determining that one or more upper layer conditions associated with a ProSe discovery message of the first ProSe relay candidate from the plurality of ProSe relay candidates comply with the relay selection rule; and connecting to the network via the first ProSe relay candidate.

15. The method of claim 14, wherein evaluating the received at least one ProSe discovery message with respect to the relay selection rule comprises:

identifying the ProSe discovery message received from the first ProSe relay candidate as complying with the relay selection rule to a greater extent than at least one other ProSe discovery message received from at least one other ProSe relay candidate of the plurality of ProSe relay candidates based at least in part on determining that the one or more upper layer conditions associated with a ProSe discovery message of the first ProSe relay candidate from the plurality of ProSe relay candidates comply with the relay selection rule based at least in part on the evaluating.

16. The method of claim 14, wherein the at least one ProSe discovery message comprises a relay offer message, and wherein evaluating the received at least one ProSe discovery message with respect to the relay selection rule comprises:

evaluating the relay offer message with respect to the relay selection rule.

17. The method of claim 16, the method further comprising:

determining the MBMS relay information message identifies at least one MBMS desired by the UE; and further selecting the first ProSe relay candidate based at least in part on the MBMS relay information message identifying the at least one MBMS desired by the UE.

18. The method of claim 17, wherein the MBMS relay information message also comprises at least a E-UTRAN cell identity (ECI).

19. The method of claim 14, wherein the at least one relay radio layer condition comprises at least a threshold relay-to-network reference signal received power (RSRP), or a threshold relay-to-network reference signal received quality (RSRQ), or a threshold relay-to-UE RSRP, or a radio validity condition, or a combination thereof.

20. The method of claim 19, wherein the radio validity condition comprises at least a first radio validity condition indicating that each threshold condition of the at least one relay radio layer condition needs to be satisfied, or a second radio validity condition indicating that at least one threshold condition of the at least one relay radio layer condition needs to be satisfied.

21. The method of claim 19, further comprising:
performing a bitwise logical AND between the provisioned PRI and a PRI received in the ProSe discovery messages.

22. The method of claim 19, further comprising:
measuring a relay-to-UE RSRP; and
comparing the measured relay-to-UE RSRP to the threshold relay-to-UE RSRP.

23. The method of claim 14, wherein the at least one upper layer condition further comprises at least a public land mobile network identifier (PLMN ID), or relay status information, or an indicator of service continuity support, or a combination thereof.

24. The method of claim 14, further comprising:
determining a compliance of the at least one relay radio layer condition with the relay selection rule; and evaluating the at least one upper layer condition with respect to the relay selection rule based at least in part on the determining.

25. The method of claim 14, further comprising:
determining a compliance of the at least one upper layer condition with the relay selection rule; and evaluating the at least one relay radio layer condition with respect to the relay selection rule based at least in part on the determining.

26. The method of claim 14, wherein the UE is configured according to the relay selection rule by a ProSe function.

27. A user equipment (UE) for wireless communication, comprising:

means for receiving, from a network, a relay selection rule, the relay selection rule comprising a set of conditions, wherein the set of conditions comprises at least one relay radio layer condition and at least one upper layer condition, and wherein the set of conditions comprises a proximity services (ProSe) Relay UE identifier (ID), relay connectivity information, and a provisioned ProSe Relay Indication (PRI), the provisioned PRI indicating a relay selection policy for accessing the network;

means for receiving, by the UE, at least one ProSe discovery message from each of a plurality of ProSe relay candidates providing access to a network, wherein the at least one ProSe discovery message comprises a Multimedia Broadcast Multicast Service (MBMS) relay information message which includes a temporary mobile group identity (TMGI) and a ProSe Group Identifier (ID) that corresponds to the TMGI, and wherein the at least one ProSe discovery message is indicative of one or more upper layer conditions;

means for evaluating, by the UE, the received at least one ProSe discovery message with respect to the relay selection rule;

means for selecting, by the UE, a first ProSe relay candidate from the plurality of ProSe relay candidates based at least in part on the evaluating and determining that one or more upper layer conditions associated with a ProSe discovery message of the first ProSe relay candidate from the plurality of ProSe relay candidates comply with the relay selection rule; and means for connecting to the network via the first ProSe relay candidate.

28. A non-transitory computer-readable medium storing code for wireless communication at a user equipment (UE), the code comprising instructions executable by one or more processors to:

receive, from a network, a relay selection rule, the relay selection rule comprising a set of conditions, wherein the set of conditions comprises at least one relay radio layer condition and at least one upper layer condition, and wherein the set of conditions comprises a proximity services (ProSe) Relay UE identifier (ID), relay connectivity information, and a provisioned ProSe Relay Indication (PRI), the provisioned PRI indicating a relay selection policy for accessing the network;

receive, by the UE, at least one ProSe discovery message from each of a plurality of ProSe relay candidates providing access to a network, wherein the at least one ProSe discovery message comprises a Multimedia Broadcast Multicast Service (MBMS) relay information message which includes a temporary mobile group identity (TMGI) and a ProSe Group Identifier (ID) that corresponds to the TMGI, and wherein the at least one ProSe discovery message is indicative of one or more upper layer conditions;

evaluate, by the UE, the received at least one ProSe discovery message with respect to the relay selection rule;

select, by the UE, a first ProSe relay candidate from the plurality of ProSe relay candidates based at least in part on the evaluating and determining that one or more upper layer conditions associated with a ProSe discovery message of the first ProSe relay candidate from the plurality of ProSe relay candidates comply with the relay selection rule; and connect to the network via the first ProSe relay candidate.

* * * * *